(12) United States Patent
Otto et al.

(10) Patent No.: US 8,577,819 B2
(45) Date of Patent: *Nov. 5, 2013

(54) METHOD AND SYSTEM TO MANAGE MULTIPLE PARTY REWARDS USING A SINGLE ACCOUNT AND ARTIFICIAL INTELLIGENCE

(75) Inventors: Jonathan Otto, Palm Beach, FL (US); Andrew Van Luchene, Santa Fe, NM (US); Raymond J Mueller, Palm Beach Gardens, FL (US); Michael R Mueller, legal representative, Oakland, CA (US)

(73) Assignee: RetailDNA, LLC, Garden City Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,335

(22) Filed: Dec. 9, 2011
(Under 37 CFR 1.47)

(65) Prior Publication Data

US 2012/0323662 A1     Dec. 20, 2012

Related U.S. Application Data

(63) Continuation of application No. 13/276,077, filed on Oct. 18, 2011, now Pat. No. 8,306,937, which is a continuation of application No. 12/322,094, filed on Jan. 29, 2009, now Pat. No. 8,041,667, which is a continuation-in-part of application No. 12/151,043, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned, said application No. 13/316,335 is a continuation-in-part of application No. 12/217,824, filed on Jul. 9, 2008, now abandoned, which is a continuation-in-part of application No. 12/151,038, filed on May 2, 2008, now abandoned, which is a continuation-in-part of application No. 11/983,679, filed on Nov. 9, 2007, now abandoned, which is a continuation-in-part of application No. 09/993,228, filed on Nov. 14, 2001, now abandoned.

(51) Int. Cl.
    *G06F 15/18*      (2006.01)
    *G06E 1/00*      (2006.01)
    *G06E 3/00*      (2006.01)
    *G06G 7/00*      (2006.01)
    *G06N 3/02*      (2006.01)

(52) U.S. Cl.
    USPC .......................................................... 706/15

(58) Field of Classification Search
None
See application file for complete search history.

(56) References Cited

U.S. PATENT DOCUMENTS 5,353,219 A    10/1994   Mueller et al.
5,794,207 A    8/1998   Walker et al.

(Continued)

OTHER PUBLICATIONS

U.S. Appl. No. 08/943483, filed Oct. 3, 1997, by Walker et al., abandoned, 50 pages.

(Continued)

*Primary Examiner* — Michael B Holmes
(74) *Attorney, Agent, or Firm* — Michael D. Downs; Fincham Downs, LLC

(57) ABSTRACT

Systems and methods for storing a transaction history with respect to a business entity, and an incentive regarding a business entity, previously offered to an account. A desired transaction involving a holder of the account and the business entity may be generated based on the transaction history and a metric. An incentive may be generated based on an artificial intelligence program (AIP), the transaction history, and the metric. The desired transaction and the incentive may be transmitted for presentation to a holder of the account.

13 Claims, 11 Drawing Sheets

(56) References Cited

U.S. PATENT DOCUMENTS

| | | |
|---|---|---|
| 6,026,375 A | 2/2000 | Hall et al. |
| 6,052,667 A | 4/2000 | Walker et al. |
| 6,085,169 A | 7/2000 | Walker et al. |
| 6,119,100 A | 9/2000 | Walker et al. |
| 6,223,163 B1 | 4/2001 | Van Luchene |
| 6,230,150 B1 | 5/2001 | Walker et al. |
| 6,267,670 B1 | 7/2001 | Walker et al. |
| 6,298,329 B1 | 10/2001 | Walker et al. |
| 6,298,331 B1 | 10/2001 | Walker et al. |
| 6,507,279 B2 | 1/2003 | Loof |
| 6,553,346 B1 | 4/2003 | Walker et al. |
| 6,567,787 B1 | 5/2003 | Walker et al. |
| 6,598,024 B1 | 7/2003 | Walker et al. |
| 6,646,659 B1 | 11/2003 | Brown et al. |
| 6,920,431 B2 | 7/2005 | Showghi et al. |
| 6,996,460 B1 | 2/2006 | Krahnstoever et al. |
| 7,028,894 B2 | 4/2006 | Turner et al. |
| 7,072,850 B1 | 7/2006 | Van Luchene |
| 7,248,855 B2 | 7/2007 | Joyce et al. |
| 7,272,569 B1 | 9/2007 | Walker et al. |
| 7,318,041 B2 | 1/2008 | Walker et al. |
| 7,437,344 B2 | 10/2008 | Peyrelevade |
| 7,542,919 B1 | 6/2009 | Mueller et al. |
| 7,587,334 B2 | 9/2009 | Walker et al. |
| 7,677,974 B2 | 3/2010 | Van Luchene |
| 7,689,508 B2 | 3/2010 | Davis et al. |
| 7,739,140 B2 | 6/2010 | Vinson et al. |
| 7,770,184 B2 | 8/2010 | Miller et al. |
| 7,806,758 B2 | 10/2010 | Van Luchene |
| 7,877,611 B2 | 1/2011 | Camacho et al. |
| 7,922,581 B2 | 4/2011 | Potts |
| 7,974,901 B2 * | 7/2011 | Van Luchene ............ 705/35 |
| 7,974,902 B2 * | 7/2011 | Van Luchene ............ 705/35 |
| 8,041,667 B2 * | 10/2011 | Otto et al. .............. 706/47 |
| 8,103,520 B2 * | 1/2012 | Mueller et al. .......... 705/1.1 |
| 8,224,760 B2 * | 7/2012 | Otto et al. .............. 706/45 |
| 8,251,810 B2 * | 8/2012 | Van Luchene ............ 463/29 |
| 8,262,471 B2 * | 9/2012 | Van Luchene ............ 463/29 |
| 8,306,937 B2 * | 11/2012 | Otto et al. .............. 706/47 |
| 2003/0018531 A1 | 1/2003 | Mahaffy et al. |
| 2003/0083936 A1 | 5/2003 | Mueller et al. |
| 2004/0002900 A1 | 1/2004 | Cohen et al. |
| 2004/0104930 A1 | 6/2004 | Stoler |
| 2004/0230440 A1 | 11/2004 | Malhotra |
| 2004/0230496 A1 | 11/2004 | Neuman et al. |
| 2005/0055236 A1 | 3/2005 | Bondy et al. |
| 2005/0194433 A1 | 9/2005 | Zimmerman |
| 2005/0203771 A1 | 9/2005 | Achan |
| 2006/0033625 A1 | 2/2006 | Johnson et al. |
| 2006/0052888 A1 | 3/2006 | Bayoumi et al. |
| 2006/0059032 A1 | 3/2006 | Wong et al. |
| 2008/0306790 A1 | 12/2008 | Otto et al. |
| 2008/0313052 A1 | 12/2008 | Otto et al. |
| 2008/0313122 A1 | 12/2008 | Otto et al. |
| 2009/0024481 A1 | 1/2009 | Otto et al. |
| 2009/0030797 A1 | 1/2009 | Otto et al. |
| 2009/0030798 A1 | 1/2009 | Otto et al. |
| 2009/0125380 A1 | 5/2009 | Otto et al. |
| 2009/0125394 A1 | 5/2009 | Otto et al. |
| 2009/0125396 A1 | 5/2009 | Otto et al. |
| 2009/0132344 A1 | 5/2009 | Otto et al. |
| 2009/0182630 A1 | 7/2009 | Otto et al. |
| 2009/0182677 A1 | 7/2009 | Otto et al. |

OTHER PUBLICATIONS

U.S. Appl. No. 09/045347, filed Mar. 20, 1998, by Alderucci et al., abandoned, 29 pages.
U.S. Appl. No. 09/083689, filed May 21, 1998, by Van Luchene, abandoned, 50 pages.
U.S. Appl. No. 09/098240, filed Jun. 16, 1998, by Walker et al., abandoned, 50 pages.
U.S. Appl. No. 09/282747, filed Mar. 31, 1999, by Walker et al., abandoned, 89 pages.
U.S. Appl. No. 09/538751, filed Mar. 30, 2000, by Walker et al., abandoned, 82 pages.
U.S. Appl. No. 60/239610, filed Oct. 11, 2000, by Mueller et al., expired, 99 pages.
Notice of Allowability mailed Jun. 20, 2011, in U.S. Appl. No. 12/322,094, 11 pages.
Office Action mailed Nov. 24, 2010, in U.S. Appl. No. 12/217,824, 9 pages.
Office Action mailed Jun. 9, 2011, in U.S. Appl. No. 12/217,824, 15 pages.
Office Action for U.S. Appl. No. 13/670,055 mailed Jun. 28, 2013, 14 pages.
Notice of Allowance for U.S. Appl. No. 13/316,307 mailed Jul. 31, 2013, 7 pages.

* cited by examiner

METHOD AND SYSTEM TO MANAGE MULTIPLE PARTY REWARDS USING A SINGLE ACCOUNT AND ARTIFICIAL INTELLIGENCE

CROSS-REFERENCE TO RELATED APPLICATIONS

The present application is a continuation-in-part application of U.S. patent application Ser. No. 13/276,077, filed Oct. 18, 2011, and entitled "Method and System to Manage Multiple Party Rewards Using a Single Account and Artificial Intelligence,"
  which is a continuation application of U.S. patent application Ser. No. 12/322,094, filed Jan. 29, 2009, issued as U.S. Pat. No. 8,041,667, and entitled "Method and System to Manage Multiple Party Rewards Using a Single Account and Artificial Intelligence,"
  which is a continuation-in-part patent application of U.S. patent application Ser. No. 12/151,043, filed May 2, 2008, and entitled "Method and System for Centralized Generation of a Business Executable Using Genetic Algorithms and Rules Distributed Among Multiple Hardware Devices,"
  which is a continuation-in-part of U.S. patent application Ser. No. 11/983,679, filed Nov. 9, 2007, and entitled "Method and System for Generating, Selecting, and Running Executables in a Business System Utilizing a Combination of User Defined Rules and Artificial Intelligence,"
  which is a continuation-in-part patent application of U.S. patent application Ser. No. 09/993,228, filed Nov. 14, 2001, and entitled "Method and Apparatus for Dynamic Rule and/or Offer Generation,"
  which applications are incorporated by reference in the present application.

The present application also is a continuation-in-part application of U.S. patent application Ser. No. 12/217,824, filed Jul. 9, 2008, and entitled "Method and System for Generating a Real Time Offer or a Deferred Offer,"
  which is a continuation-in-part of U.S. patent application Ser. No. 12/151,038, filed May 2, 2008, and entitled "Method and Apparatus for Generating and Transmitting an Order Initiation Offer to a Wireless Communications Device,"
  which is a continuation-in-part of U.S. patent application Ser. No. 11/983,679, filed Nov. 9, 2007, and entitled "Method and System for Generating, Selecting, and Running Executables in a Business System Utilizing a Combination of User Defined Rules and Artificial Intelligence,"
  which is a continuation-in-part patent application of U.S. patent application Ser. No. 09/993,228, filed Nov. 14, 2001, and entitled "Method and Apparatus for Dynamic Rule and/or Offer Generation,"
  which applications are incorporated by reference in the present application.

This application is related to: U.S. patent application Ser. No. 09/052,093 entitled "Vending Machine Evaluation Network" and filed Mar. 31, 1998; U.S. patent application Ser. No. 09/083,483 entitled "Method and Apparatus for Selling an Aging Food Product" and filed May 22, 1998; U.S. patent application Ser. No. 09/282,747 entitled "Method and Apparatus for Providing Cross-Benefits Based on a Customer Activity" and filed Mar. 31, 1999; U.S. patent application Ser. No. 08/943,483 entitled "System and Method for Facilitating Acceptance of Conditional Purchase Offers (CPOs)" and filed on Oct. 3, 1997, which is a continuation-in-part of U.S. patent application Ser. No. 08/923,683 entitled "Conditional Purchase Offer (CPO) Management System For Packages" and filed Sep. 4, 1997, which is a continuation-in-part of U.S. patent application Ser. No. 08/889,319 entitled "Conditional Purchase Offer Management System" and filed Jul. 8, 1997, which is a continuation-in-part of U.S. patent application Ser. No. 08/707,660 entitled "Method and Apparatus for a Cryptographically Assisted Commercial Network System Designed to Facilitate Buyer-Driven Conditional Purchase Offers," filed on Sep. 4, 1996 and issued as U.S. Pat. No. 5,794,207 on Aug. 11, 1998; U.S. patent application Ser. No. 08/920,116 entitled "Method and System for Processing Supplementary Product Sales at a Point-Of-Sale Terminal" and filed Aug. 26, 1997, which is a continuation-in-part of U.S. patent application Ser. No. 08/822,709 entitled "System and Method for Performing Lottery Ticket Transactions Utilizing Point-Of-Sale Terminals" and filed Mar. 21, 1997; U.S. patent application Ser. No. 09/135,179 entitled "Method and Apparatus for Determining Whether a Verbal Message Was Spoken During a Transaction at a Point-Of-Sale Terminal" and filed Aug. 17, 1998; U.S. patent application Ser. No. 09/538,751 entitled "Dynamic Propagation of Promotional Information in a Network of Point-of-Sale Terminals" and filed Mar. 30, 2000; U.S. patent application Ser. No. 09/442,754 entitled "Method and System for Processing Supplementary Product Sales at a Point-of-Sale Terminal" and filed Nov. 12, 1999; U.S. patent application Ser. No. 09/045,386 entitled "Method and Apparatus For Controlling the Performance of a Supplementary Process at a Point-of-Sale Terminal" and filed Mar. 20, 1998; U.S. patent application Ser. No. 09/045,347 entitled "Method and Apparatus for Providing a Supplementary Product Sale at a Point-of-Sale Terminal" and filed Mar. 20, 1998; U.S. patent application Ser. No. 09/083,689 entitled "Method and System for Selling Supplementary Products at a Point-of Sale and filed May 21, 1998; U.S. patent application Ser. No. 09/045,518 entitled "Method and Apparatus for Processing a Supplementary Product Sale at a Point-of-Sale Terminal" and filed Mar. 20, 1998; U.S. patent application Ser. No. 09/076,409 entitled "Method and Apparatus for Generating a Coupon" and filed May 12, 1998; U.S. patent application Ser. No. 09/045,084 entitled "Method and Apparatus for Controlling Offers that are Provided at a Point-of-Sale Terminal" and filed Mar. 20, 1998; U.S. patent application Ser. No. 09/098,240 entitled "System and Method for Applying and Tracking a Conditional Value Coupon for a Retail Establishment" and filed Jun. 16, 1998; U.S. patent application Ser. No. 09/157,837 entitled "Method and Apparatus for Selling an Aging Food Product as a Substitute for an Ordered Product" and filed Sep. 21, 1998, which is a continuation of U.S. patent application Ser. No. 09/083,483 entitled "Method and Apparatus for Selling an Aging Food Product" and filed May 22, 1998; U.S. patent application Ser. No. 09/603,677 entitled "Method and Apparatus for selecting a Supplemental Product to offer for Sale During a Transaction" and filed Jun. 26, 2000; U.S. Pat. No. 6,119,100 entitled "Method and Apparatus for Managing the Sale of Aging Products and filed Oct. 6, 1997 and U.S. Provisional Patent Application No. 60/239,610 entitled "Methods and Apparatus for Performing Upsells" and filed Oct. 11, 2000.

By "related to" we mean that the present application and the applications noted above are in the same general technological area and have a common inventor or assignee. However, "related to" does not necessarily mean that the present application and any or all of the applications noted above are patentably indistinct, or that the filing date for the present application is within two months of any of the respective filing dates for the applications noted above.

FIELD OF THE INVENTION

The disclosure relates generally, in accordance with some embodiments, to a method and system for managing rewards for a multi-tiered account and, more particularly, to a method and system for providing such management using artificial intelligence. The disclosure relates generally, in accordance with some embodiments, to a method and system to generate and transmit follow-up offers to a WCD, from which an order has been received, using one or both of at least one rule or an artificial intelligence program.

BACKGROUND OF THE INVENTION

The management of rewards for an account is known, for example, as disclosed in U.S. Published Patent Applications 2002/0087410 (Walker et al.), incorporated by reference herein. Unfortunately, such programs are not self-learning.

Thus, there is a long-felt need to provide a system and a method to manage rewards for a multi-tiered account that is dynamic and can be readily adapted to meet various and variable requirements.

SUMMARY OF THE INVENTION

In one embodiment, a system is provided for managing an account having at least one sub-account, including: a memory unit, for at least one specially programmed general-purpose computer, for storing a transaction history for the account with respect to a business entity, an incentive regarding the business entity previously offered to the account, and an artificial intelligence program (AIP), wherein the transaction history includes at least one transaction involving the business entity and the main account or the business entity and the at least one sub-account; a processor for the at least one specially programmed general-purpose computer for: comparing the transaction history with a metric; generating, using the comparison of the transaction history with the metric, a desired transaction involving the account and the business entity; and modifying the incentive using the AIP and the comparison of the transaction history with the metric, wherein rewarding of the modified incentive is conditional upon execution of the desired transaction; and an interface element, for the at least one specially programmed general-purpose computer, for transmitting the desired transaction and the modified incentive for presentation to a holder of the account.

In one embodiment, the processor is for determining the metric using the AIP and the memory element is for storing the metric. In another embodiment, the memory element is for storing data regarding the account, the data different than the transaction history and the processor is for: generating, using the data and the AIP, the metric; comparing the transaction history with the metric using the data; generating the desired transaction using the data; modifying the incentive using the data; or transmitting the desired transaction and the modified incentive using the data. In a further embodiment, comparing the transaction history with the metric includes using the AIP. In yet another embodiment, the processor is for generating the incentive using the AIP.

In one embodiment, the interface element is for receiving data regarding a transaction, between the business entity and the account, transacted following transmission of the desired transaction and the modified incentive and the processor is for comparing the data with respect to the desired transaction. For compliance of the transaction with the desired transaction, the processor is for authorizing reward of the modified incentive. For non-compliance of the transaction with the desired transaction, the processor is for further modifying, using the AIP, the modified incentive according to the comparison of the transaction and the desired transaction.

In one embodiment, the processor is for generating, using the AIP, at least one rule, the memory element is for storing the at least one rule, and the processor is for generating the desired transaction using the at least one rule or modifying the incentive using the at least one rule. In another embodiment, the memory element is for storing at least one rule, the processor is for modifying, using the AIP, the at least one rule according to the comparison of the transaction history with the metric, and the processor is for generating the desired transaction using the at least one modified rule or modifying the incentive using the at least one modified rule.

In one embodiment, the processor is for generating, using the transaction history and the AIP, a conversion metric, the interface element is for receiving a request to transfer a reward within the account, and the processor is for modifying the reward using the conversion metric and transferring the modified reward within the account. In another embodiment, the interface element is for receiving at least one rule from a wireless communications device (WCD) or from a general-purpose computer associated with the business entity or another business entity, the memory element is for storing the at least one rule, and the processor is for: comparing the transaction history with the metric using the at least one rule; modifying the incentive using the at least one rule; generating the desired transaction using the at least one rule; or transmitting the desired transaction and the modified incentive using the at least one rule.

In one embodiment, the processor is for transmitting the desired transaction and the modified incentive to a WCD with a memory element and a processor, and the memory element for the WCD is for storing the at least one rule, and the processor for the WCD is for executing the desired transaction or the modified incentive according to the at least one rule.

In one embodiment, a system is provided for managing an account having at least one sub-account, including: a memory unit, for at least one specially programmed general-purpose computer, for storing a transaction history for the account with respect to a business entity and an artificial intelligence program (AIP), the transaction history including at least one transaction involving the business entity and the main account or the business entity and the at least one sub-account; a processor for the at least one specially programmed general-purpose computer for: comparing the transaction history with a metric; generating, using the AIP and the comparison of the transaction history with the metric, a desired transaction involving the account and the business entity; and generating, using the AIP and the comparison of the transaction history with the metric, an incentive, rewarding of the incentive conditional upon execution of the desired transaction; and an interface element, for the at least one specially programmed general-purpose computer, for transmitting the desired transaction and the incentive for presentation to a holder of the account.

Some embodiments comprise a method for managing an account having at least one sub-account.

In one embodiment, a system is provided for generating a real time offer or a deferred offer, including: an interface element, for at least one specially programmed general-purpose computer, arranged to receive an order from an end user device (EUD), the order including a first item or service available from a first business entity; and an offer element, in a processor for the at least one specially programmed general-purpose computer, arranged to: generate, prior to fulfillment of the order by the first business entity and using at least one of a first set of rules or a first artificial intelligence program stored in a memory unit for the at least one specially programmed general-purpose computer, a first offer fulfillable as part of the order; and generate, prior to fulfillment of the order by the first business entity and using the processor and at least one of a second set of rules or a second artificial intelligence program stored in the memory unit, a second offer fulfillable after fulfillment of the order by the first business entity; and transmit, using the interface element, the first and second offers to the EUD.

In one embodiment, the first and second sets of rules are the same or the first and second artificial intelligence programs are the same. In another embodiment, the first and second offers are the same. In a further embodiment, the first and second offers include second and third items or services, respectively and the second and third items or services are the same or the second and third items or services are different. In yet another embodiment, the first and second offers include first and second incentives, respectively and the first and second incentives are the same or the first and second incentives are different.

In one embodiment, the offer element is arranged to determine, using at least one of a third set of rules or a third artificial intelligence program stored in the memory unit, whether to transmit the second offer before or after receipt of payment for the second offer. In another embodiment, the EUD is a wireless communications device (WCD) storing at least one third rule in a memory element for the WCD and arranged to execute, using a processor in the WCD, the first or second offer according to the at least one third rule. In a further embodiment the interface element is arranged to receive at least one third rule from a WCD, or from a general-purpose computer associated with a second business entity and the offer element is arranged to: store the at least one third rule in the memory element; and modify the first or second offer using the processor and the at least one third rule. In yet another embodiment, the first and second business entities are the same.

Some embodiments comprise a method for generating a real time offer or a deferred offer.

It is a general object, in accordance with some embodiments of the present invention, to provide a system and a method to generate real time or deferred offers.

It is a general object, in accordance with some embodiments of the present invention, to provide a system and a method to manage rewards for a multi-tiered account that is dynamic and can be readily adapted to meet various and variable requirements.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of various embodiments of the present invention will now be more fully described in the following detailed description of the invention taken with the accompanying drawing Figures, in which.

DETAILED DESCRIPTION

At the outset, it should be appreciated that like drawing numbers on different drawing views identify identical, or functionally similar, structural elements of the invention. While various embodiments of the present invention are described with respect to what is presently considered to be the preferred aspects, it is to be understood that any particular embodiments as claimed are not limited to the disclosed aspects.

Furthermore, it is understood that the various embodiments of the invention are not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein shall include the same meaning as commonly understood to one of ordinary skill in the art to which this invention belongs. Although any methods, devices or materials similar or equivalent to those described herein can be used in the practice or testing of the invention, the preferred methods, devices, and materials are now described.

It should be understood that the use of "or" in the present application is with respect to a "non-exclusive" arrangement, unless stated otherwise. For example, when saying that "item x is A or B," it is understood that this can mean one of the following: 1) item x is only one or the other of A and B; and 2) item x is both A and B. Alternately stated, the word "or" is not used to define an "exclusive or" arrangement. For example, an "exclusive or" arrangement for the statement "item x is A or B" would require that x can be only one of A and B.

Figure 1:
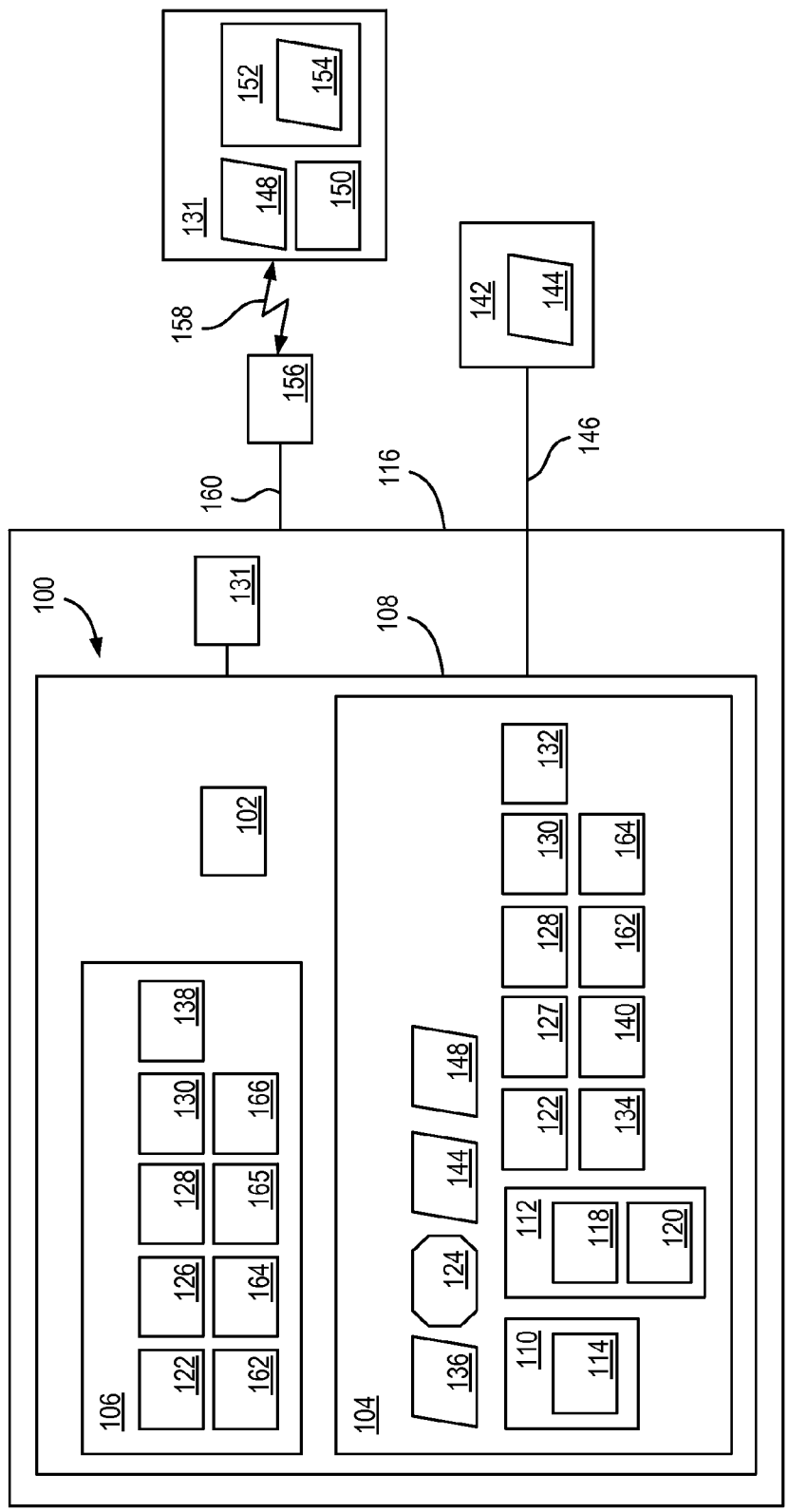
FIG. 1 is a schematic block diagram of a present invention system for managing an account having at least one sub-account.

FIG. 1 is a schematic block diagram of present invention system 100 for managing an account having at least one sub-account. The system includes interface element 102, memory element 104, and processor 106 for at least one specially programmed general-purpose computer 108. The memory element stores transaction history 110 for account 112. The transaction history includes at least one transaction 114 involving a business entity, for example, the business entity associated with location 116 and account 112. Any transaction involving a customer and a business entity is included in the spirit and scope of the claimed invention. Account 112 includes main, or master, account 118 and at least one sub-account 120. Thus, account 112 includes one or more sub-accounts. Account 112 is not limited to a particular number of sub-accounts. Transaction 114 can include any combination of the main account and one or more sub-accounts from sub-accounts 120. For example, the transaction can include the main account and a sub-account from sub-accounts 120, or can include only sub-accounts from sub-accounts 120. The memory element also stores incentive 122, previously offered to the account by the business entity, and artificial intelligence program (AIP) 124. In one embodiment, the processor updates the transaction history with transaction 114.

In one embodiment, the processor is for generating comparison 126 by comparing the transaction history with metric 127 and generating, using the comparison, desired transaction 128 involving the account and the business entity. Metric 127 can be any metric known in the art and the metric can be part of any classification system known in the art. In another embodiment, the processor generates modified incentive 130 by modifying incentive 122 using the AIP and the comparison. In a further embodiment, the desired transaction and the modified incentive are stored in the memory element. The eventual rewarding of the modified incentive is conditional upon execution of the desired transaction as described infra. In one embodiment, the processor transmits, via the interface element, desired transaction 128 and modified incentive 130 for presentation to a holder (not shown) of the account. Incentive 130 can be any incentive known in the art, for example, including, but not limited to a discount on an item or service or a free item or service. Hereinafter, the term "incentive" if not further delineated refers to incentive 122 or modified incentive 130.

In one embodiment, desired transaction 128 and modified incentive 130 are transmitted for presentation on any point of sale (POS) station known in the art, for example, POS station 131 in location 116. In another embodiment, the offer is transmitted for presentation on any device, remote from a location associated with the first business entity, such as location 116, known in the art, for example, a remote kiosk (not shown) or a wireless communications device (WCD), for example, WCD 131. WCD 131 can be any WCD known in the art. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to interaction of the WCD and system 100.

By interface element, we mean any combination of hardware, firmware, or software in a computer used to enable communication or data transfer between the computer and a device, system, or network external to the computer. The interface element can connect with the device, system, or network external to the computer using any means known in the art, including, but not limited to a hardwire connection, an optical connection, an Internet connection, or a radio frequency connection. Processor 106 and interface element 102 can be any processor or interface element, respectively, or combination thereof, known in the art.

Computer 108 can be any computer or plurality of computers known in the art. In one embodiment, the computer is located in a retail location with which system 100 is associated, for example, location 116. In another embodiment (not shown), all or parts of the computer are remote from retail locations with which system 100 is associated. In a further embodiment, computer 108 is associated with a plurality of retail locations with which system 100 is associated. Thus, the computer provides the functionality described for more than one retail location.

In another embodiment, the processor determines metric 127 using the AIP and the memory element stores the metric. In another embodiment, the processor compares the transaction history with the metric using the AIP. In a further embodiment, the processor generates the incentive using the AIP. That is, the processor generates the incentive modified in the processor operation described supra.

In one embodiment, the memory element stores data 132 regarding the account. Data 132 includes information other than the information shown in history 110, for example, information regarding one or more holders of the main or sub-accounts in account 112. The processor performs one or more of the following operations using the data: generating, using the AIP, the metric; comparing the transaction history with the metric; generating the desired transaction (in addition to using the AIP); modifying the incentive; or transmitting the respective data, for example, the format or content of the display of the desired transaction or incentive is configured according to information in data 132.

In one embodiment, the interface element receives data 134 regarding a transaction between the business entity and the account transacted following transmission of the respective data, and the processor compares data 134 with respect to the desired transaction. For example, if the desired transaction was a transaction including the main account and two sub-accounts, the processor determines if the transaction described by data 134 included the main account and two sub-accounts. For compliance of the transaction with the desired transaction, the processor authorizes reward of the modified incentive. The modified incentive can be rewarded using any means known in the art. The award can be provided by the business entity with which the account is transacting or by another entity, for example, a business entity contracted by the business entity to handle provision of rewards. For non-compliance of the transaction with the desired transaction, in one embodiment, the processor uses the AIP to further modify the modified incentive according to the comparison of the transaction and the desired transaction. For example, the processor and the AIP determine how to make the incentive more attractive to holders of the account such that the holders are motivated to perform the desired transaction.

In one embodiment, the memory element stores at least one rule 136. In general, rule 136 can be used in place of or in conjunction with the AIP in any or all of the operations described infra and supra regarding the AIP. For example, the processor uses the rule in one or more of the following operations: to generate or modify the desired transaction, the incentive, or the metric, to compare the transaction history with the metric, or to transmit the desired transaction or incentive. In another embodiment, the processor generates or modifies rule 136 using the AIP. In a further embodiment, the rule is modified using the AIP according to the comparison of the transaction history with the metric. Thus, the system is self-learning with respect to the rule and the rule can be automatically modified according to feed-back or changes in a metric or other benchmark. It should be understood that a modified rule 136 can be used for any or all of the operations described supra or infra for rule 136. Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007 is applicable to the operation of the AIP and rule 136.

In one embodiment, the processor generates conversion metric 138, using the AIP and the transaction history or data 134. The conversion metric is used for modifying rewards transferred between the main account and the sub-accounts or among the sub-accounts. Upon receipt by the interface element of a request to transfer a reward, for example, reward 140, within the account, the processor modifies the reward using the conversion metric and transfers the modified reward within the account. For example, according to compliance of a sub-account with respect to a specified metric, there may be a bonus, no modification, or a penalty applied to rewards transferred to or from the sub-account.

In one embodiment, computer 142, separate from computer 108, transmits modifying rule 144 to computer 108. Computer 142 can be in location 116 (not shown) or can be in a different location. Computer 142 can be associated with a business entity associated with location 116 or can be associated with a different business entity. Connection 146 between computers 108 and 142 can be any type known in the art. In another embodiment (not shown), multiple computers 142 are included and respective computers among the multiple computers can be associated with the same or different business entities. Computer 108 stores modifying rule 142 in memory 104.

In one embodiment, rule 142 is used with or in place of rule 136, or is used in conjunction with the AIP. For example, the processor can perform one or more of the following operations using rule 142: generate or modify the desired transaction, the incentive, or the metric, compare the transaction history with the metric, or transmit the desired transaction or incentive. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 142.

In one embodiment, computer 108 receives at least one modifying rule 148 from a WCD associated with the customer, for example, WCD 131, and stores the rule in memory 104. In one embodiment, rule 148 is used with or in place of rule 136, or is used in conjunction with the AIP. For example, the processor can perform one or more of the following operations using rule 148: generate or modify the desired transaction, the incentive, or the metric, compare the transaction history with the metric, or transmit the desired transaction or incentive. Commonly owned U.S. patent application Ser. No. 12/151,043, filed May 2, 2008 and entitled "Method and System For Centralized Generation of a Business Executable Using Genetic Algorithms and Rules Distributed Among Multiple Hardware Devices" is applicable to the respective operations of computer 108 with respect to rule 148.

In one embodiment, a WCD, for example, WCD 131, with a processor and a memory element, for example, processor 150 and memory 152, is usable to receive the desired transaction and the incentive. The memory element for the WCD stores at least one rule, for example, rule 154 and the processor for the WCD executes the desired transaction or the incentive according to the rule, for example, rule 154. Commonly-owned and co-pending U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008 is applicable to the operations described regarding WCD 131, processor 150, rule 154, and presentation of the desired transaction or the incentive.

In one embodiment, a WCD usable with system 100, for example, WCD 131, is owned by, leased by, or otherwise already in possession of an end user when system 100 interfaces with the WCD. In the description that follows, it is assumed that the WCD is owned by, leased by, or otherwise already in possession of the end user when system 100 interfaces with the WCD. In general, the WCD communicates with a network, for example, network 156, via radio-frequency connection 158. Network 156 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 156 using any means known in the art, including, but not limited to a hardwire connection, an optical connection, an Internet connection, or a radio frequency connection. In the figures, a non-limiting example of a hardwire connection 160 is shown. In one embodiment, device 131 is connectable to a docking station (not shown) to further enable communication between device 131 and system 100. Any docking station or docking means known in the art can be used. That is, when the device is connected to the docking station, a link is established between the device and system 100.

In one embodiment, the processor generates classification 162 for the account according to history 110. In another embodiment, metric 164 is used by the processor to generate the classification. Metric 164 can be any metric known in the art and the metric can be part of any classification system known in the art in order to result in classification 162. For example, in one embodiment, the intent of classification 162 is to place the account in a hierarchy of candidacy for desired transactions or incentives. For example, the more favorable the comparison, the higher the customer's position in the hierarchy and the more valuable or attractive the desired transactions or incentives potentially available to the customer. Thus, the incentive can be made more or less valuable or attractive according to the classification.

In one embodiment, classification 162 is used by the processor: to generate or modify the desired transaction, the incentive, or the metric; to compare the transaction history with the metric; or to transmit the desired transaction or incentive. For example, the classification can be an indication of how favorably the account is transacting with the business entity, for example, with respect to parameters regarding revenue or profitability for the business entity. Thus, for example, accounts with a more favorable classification can be offered more attractive desired transactions or incentives. In another embodiment, the processor uses the AIP to generate or modify metric 164 or classification 162.

In one embodiment, the desired transaction includes a good or service (not shown) offered by the business entity and the incentive can be an offer related to the good or service. The good or service can be any good or service known in the art. The following commonly-owned U.S. patent applications are applicable to the use of the AIP and or the rules described supra to generate an incentive including an offer: U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application Ser. No. 12/151/043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; commonly-owned U.S. patent application Ser. No. 12/151, 038, titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008; commonly-owned U.S. patent application Ser. No. 12/151,040, entitled "METHOD AND SYSTEM FOR MANAGING TRANSACTIONS INITIATED VIA A WIRELESS COMMUNICATIONS DEVICE", filed May 2, 2008; commonly-owned U.S. patent application Ser. No. 12/151,042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application Ser. No. 12/151,042, entitled "METHOD AND SYSTEM FOR GENERATING AN OFFER AND TRANSMITTING THE OFFER TO A WIRELESS COMMUNICATIONS DEVICE", filed May 2, 2008; commonly-owned U.S. patent application entitled "SYSTEM AND METHOD FOR PROVIDING INCENTIVES TO AN END USER FOR REFERRING ANOTHER END USER", inventors Otto et al., filed Jul. 9, 2008; commonly-owned U.S. patent application entitled "METHOD AND SYSTEM FOR GENERATING A REAL TIME OFFER OR A DEFERRED OFFER", inventors Otto et al., filed Jul. 9, 2008; commonly-owned U.S. patent application entitled "METHOD AND APPARATUS FOR GENERATING AND TRANSMITTING AN IDEAL ORDER OFFER", inventors Otto et al., filed Jul. 9, 2008; commonly-owned U.S. patent application entitled "SYSTEM AND METHOD FOR GENERATING AND TRANSMITTING LOCATION BASED PROMOTIONAL OFFER REMINDERS", inventors Otto et al., filed Jul. 9, 2008; commonly-owned U.S. patent application entitled "SYSTEM AND METHOD FOR LOCATION BASED SUGGESTIVE SELLING", filed Jul. 9, 2008; and commonly-owned U.S. patent application entitled "SYSTEM AND METHOD FOR SCANNING A COUPON TO INITIATE AN ORDER", filed May 2, 2008.

In one embodiment, the processor determines optimization 165 of revenue or profitability for the business entity as a parameter for: generating or modifying the desired transaction, the incentive, or the metric; comparing the transaction history with the metric, or transmitting the respective data. For example, the processor can determine the success of the transactions in history 110 in attaining the optimization of revenue or profitability. Any measure or metric known in the art can be used with respect to the revenue or profitability, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results. In another embodiment, the processor determines the optimization of revenue or profitability using the AIP.

In one embodiment, metric 126 or metric 164 are with respect to the revenue or profitability of the business entity, including, but not limited to optimizing or maximizing revenues, profits, item counts, average check, market basket contents, marketing offer acceptance, store visitation or other frequency measures, or improving or optimizing speed of service, inventory levels, turns, yield, waste, or enhancing or optimizing customer loyalty or use of kiosks or internet or other POS devices, or use of off peak or other coupons or acceptance of upsell or other marketing offers, or reduction or optimization of any customer or employee or any other person's gaming, fishing, or any other undesirable action or activities and/or failures to act when desired, or minimizing or optimizing any dilution or diversion of sales, profits, average check, or minimizing or optimizing use of discounts and other promotions so as to maximize or optimize any of the foregoing desired actions, outcomes or other desired benefits, or any combination of minimizing undesired results while maximizing or optimizing any one or more of any desired results.

In one embodiment, the processor is for generating or modifying format or temporal parameter 166 for presentation of the desired transaction or the incentive. For example, the parameter is with respect to a time of day, week, month, or year at which the desired transaction or incentive is presented, or with respect to a frequency with which the desired transaction or incentive is presented. The processor transmits the format or temporal parameter along with the desired transaction and the incentive for presentation. In another embodiment, the processor uses the AIP to generate or modify parameter 166.

In one embodiment, the memory unit stores the transaction history and the AIP; and the processor compares the transaction history with a metric, for example, metric 127, generates, using the AIP and the comparison of the transaction history with the metric, a desired transaction involving the account and the business entity, for example, transaction 128, and generates, using the AIP and the comparison of the transaction history with the metric, an incentive, for example, incentive 122. The rewarding of the incentive is conditional upon execution of the desired transaction. The interface element transmits the desired transaction and the incentive for presentation to a holder of the account.

Commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007, is applicable to the operations involving the AIP or any rules, noted supra and infra, for example, generating or modifying the desired transaction, the incentive, or the metric, comparing the transaction history with the metric, or transmitting the desired transaction or incentive or other operations described herein with respect to the AIP.

System 100 can generate, determine, modify, or manage the following:
1. Customer ratings, for example, classification 162, that is, a score or rating given to each customer to determine the type of desired transaction or incentive for which the customer qualifies. The rating can be adjusted based on:
    a. the transaction total of one or more transactions, for example, as found in the transaction history
    b. temporal parameters, such as the time since the last transaction
    c. use of coupons
    d. purchase of discounted or non-discounted products
    e. purchase of loss leaders
    f. any other metric to determine how profitable a customer, or a transaction associated with the customer, is for a business entity operating or benefiting from system 100
2. Incentive modification, for example, the augmentation of incentive 122 or 130. That is, an incremental, additive incentive, for example, discount percent or fixed dollar amount, that is generated or modified and then added to encourage compliance with the desire transaction 3. Maximum discount. That is, the maximum incentive, for example, percent or fixed dollar discount, that can be applied to any desired transaction
4. Grace period. That is, temporal parameters governing compliance of the customer, for example, the amount of time given to comply with a desired transaction
5. Adjusting an incentive discount and determining when to apply the discount
6. Presentation, that is, how the desired transaction and incentive are outputted and conveyed to customer, for example, print a coupon or output email based on whether or not customer has a frequent shopper card
7. Rules governing incentives, for example, discounts, given to loyal customers
8. Rules defining a loyal customer
9. Price of incentive or discount
10. Time between transactions
11. Incentive or discount amount The discussion in commonly-owned U.S. patent application Ser. No. 11/983,679, filed Nov. 9, 2006 and entitled "Method and System for Generating, Selecting, and Running Executables in a Business System Utilizing a Combination of User Defined Rules and Artificial Intelligence" is applicable to the modification of incentives 122 or 130, or the desired transaction by the processor.

As disclosed in commonly-owned U.S. patent application titled: "METHOD AND APPARATUS FOR GENERATING AND TRANSMITTING AN IDEAL ORDER OFFER," inventors Otto et. al, filed Jul. 9, 2008, which application is incorporated by reference herein, in one embodiment, the processor reviews the transaction history to identify an item or service not included in the history (and presumably never ordered by the customer) or ordered by the customer at less than a predetermined frequency. Then, the processor, using the AIP, optimizes the desired transaction and the incentive, for example, by including an upsell in the incentive for an item or service not included in the information or ordered at less than a predetermined frequency. In another embodiment, this pairing is used to realize the optimization of revenue or profits for the business entity.

It should be understood that various storage and removal operations, not explicitly described above, involving memory 104 and as known in the art, are possible with respect to the operation of system 100. For example, outputs from and inputs to the general-purpose computer can be stored and retrieved from the memory elements and data generated by the processor can be stored in and retrieved from the memory.

It should be understood that system 100 can be operated by the same business entity operating or owning a business location using the system, or can be operated by a third party different than the business entity operating or owning the business location using the system. In one embodiment, a third party operates system 100 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

It should be understood that system 100 can be integral with a computer operating system for a business location, for example, location 116 or with a business entity operating the business location. It also should be understood that system 100 can be wholly or partly separate from the computer operating system for a retail location, for example, location 116, or with a business entity operating the business location.

It should be understood that although individual rule sets and a single artificial intelligence program are discussed, various of the individual rule sets can be combined into composite rules set (not shown). Further, the functions described for AIP 124 can be implemented by combinations of separate AIPs (not shown). Any combination of individual rule sets or artificial intelligence programs is included in the spirit and scope of the claimed invention.

In general, system 100, and in particular, the processor using the AI program, operates to use artificial intelligence, for example, a generic algorithm, to inform or make some or all of the decisions discussed in the description for FIG. 1. In one embodiment, system 100 generates or modifies the desired transaction, the incentive, or the metric, compares the transaction history with the metric, or transmits the desired transaction or incentive, or performs the other operations described herein to attain or maximize an objective of the business entity, for example, performance with respect to metric 126. Factors usable to determine an objective can include, but are not limited to: customer acceptance rate, profit margin percentage, customer satisfaction information, service times, average check, inventory turnover, labor costs, sales data, gross margin percentage, sales per hour, cash over and short, inventory waste, historical customer buying habits, customer provided information, customer loyalty program data, weather data, store location data, store equipment package, POS system brand, hardware type and software version, employee data, sales mix data, market basket data, or trend data for at least one of these variables. Thus, the present invention, for example, system 100, specifically, computer 108 and processor 106, use artificial intelligence, for example, AIP 124 to automatically generate or modify operations, parameters, and outputs with respect to a goal, for example, a metric such as metric 127 and automatically adapts the generation or modification operations, parameters, and outputs to feedback, that is, the present invention is self-learning and self-adapting with respect to generating or modifying operations, parameters, and outputs. Further, the present invention can automatically generate or modify the goal and be self-learning and self-adapting with respect to the goal.

Figure 2:
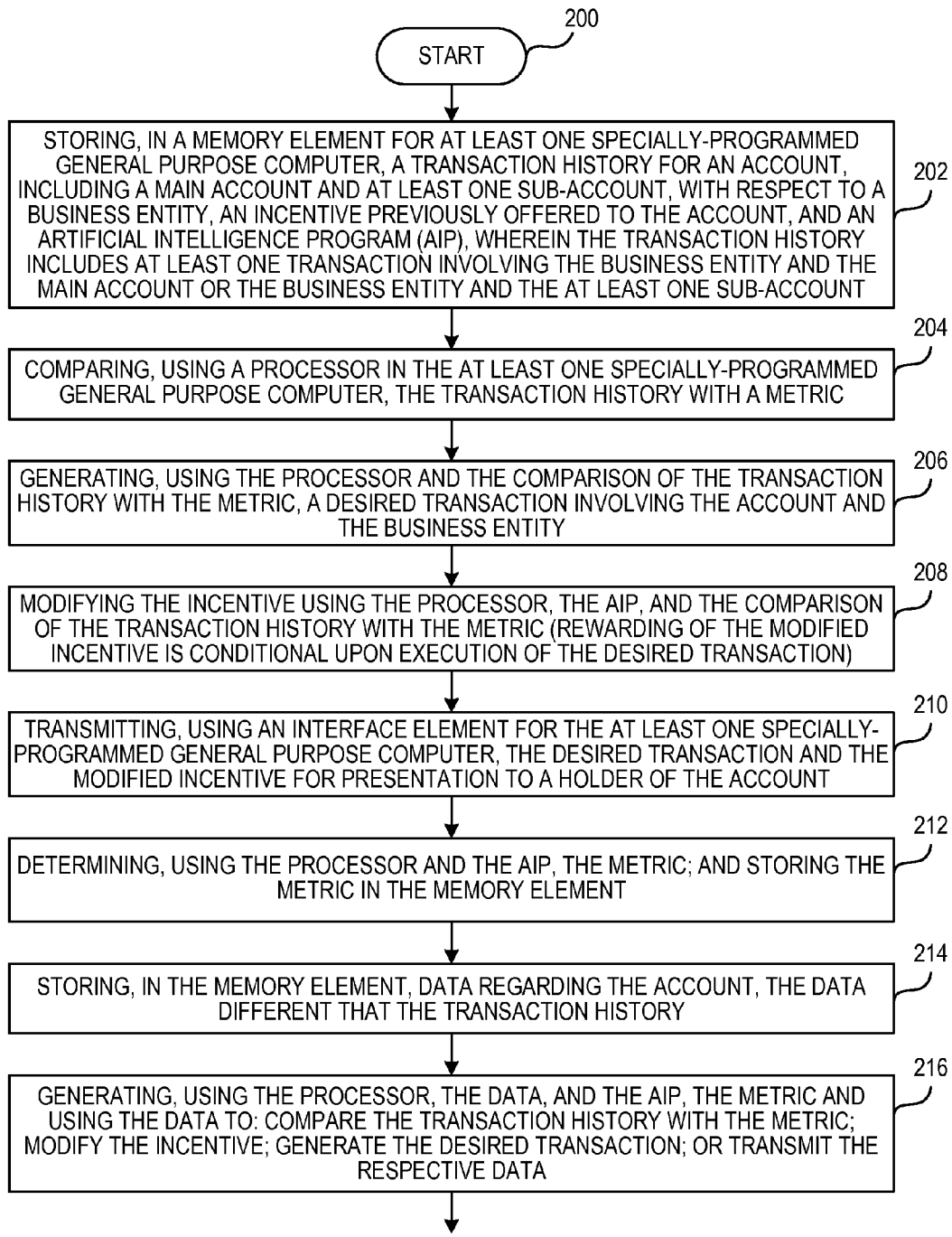
FIG. 2 is a flow chart of a present invention method for managing an account having at least one sub-account.
Figure 2:
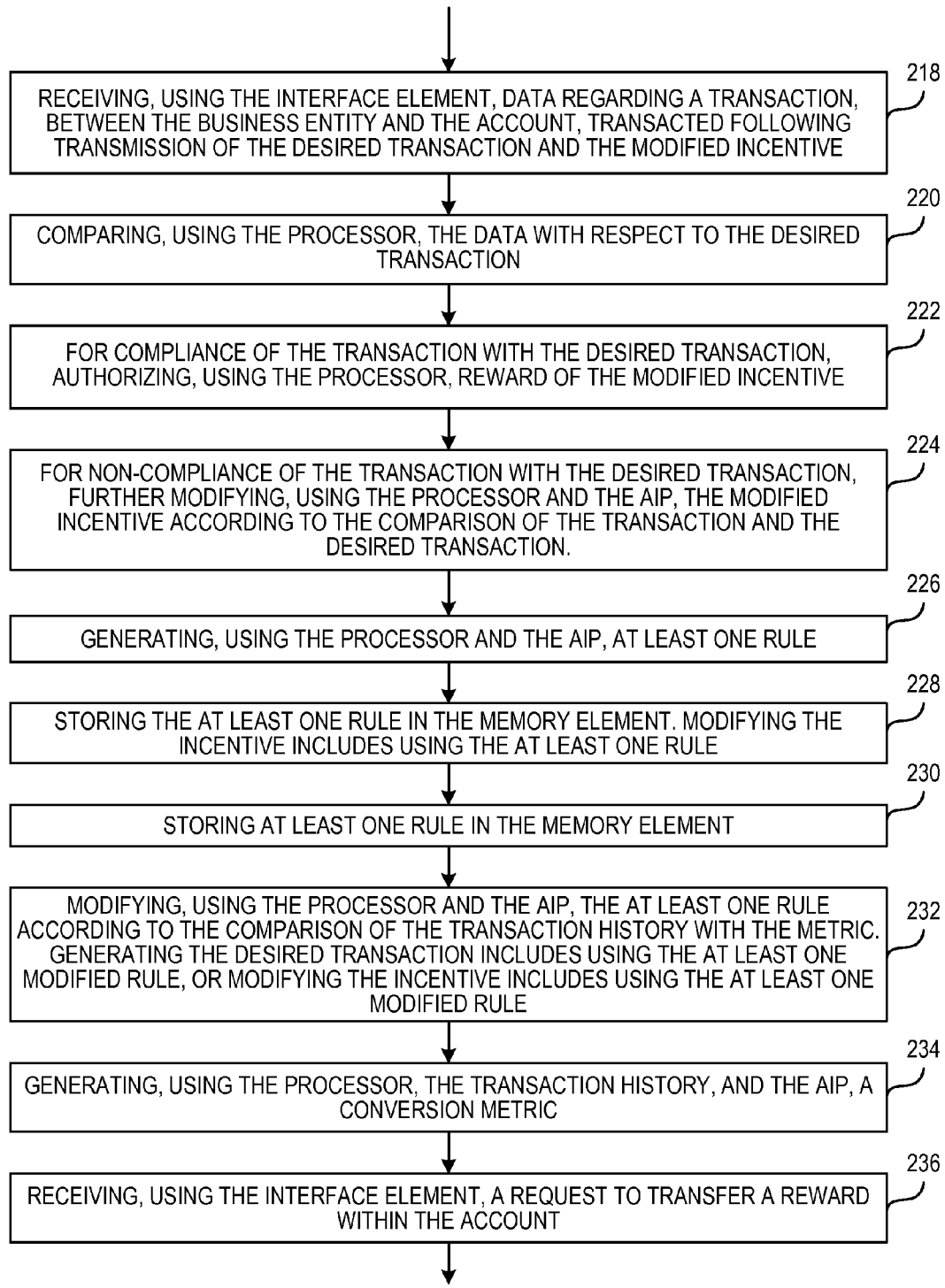
Figure 2:
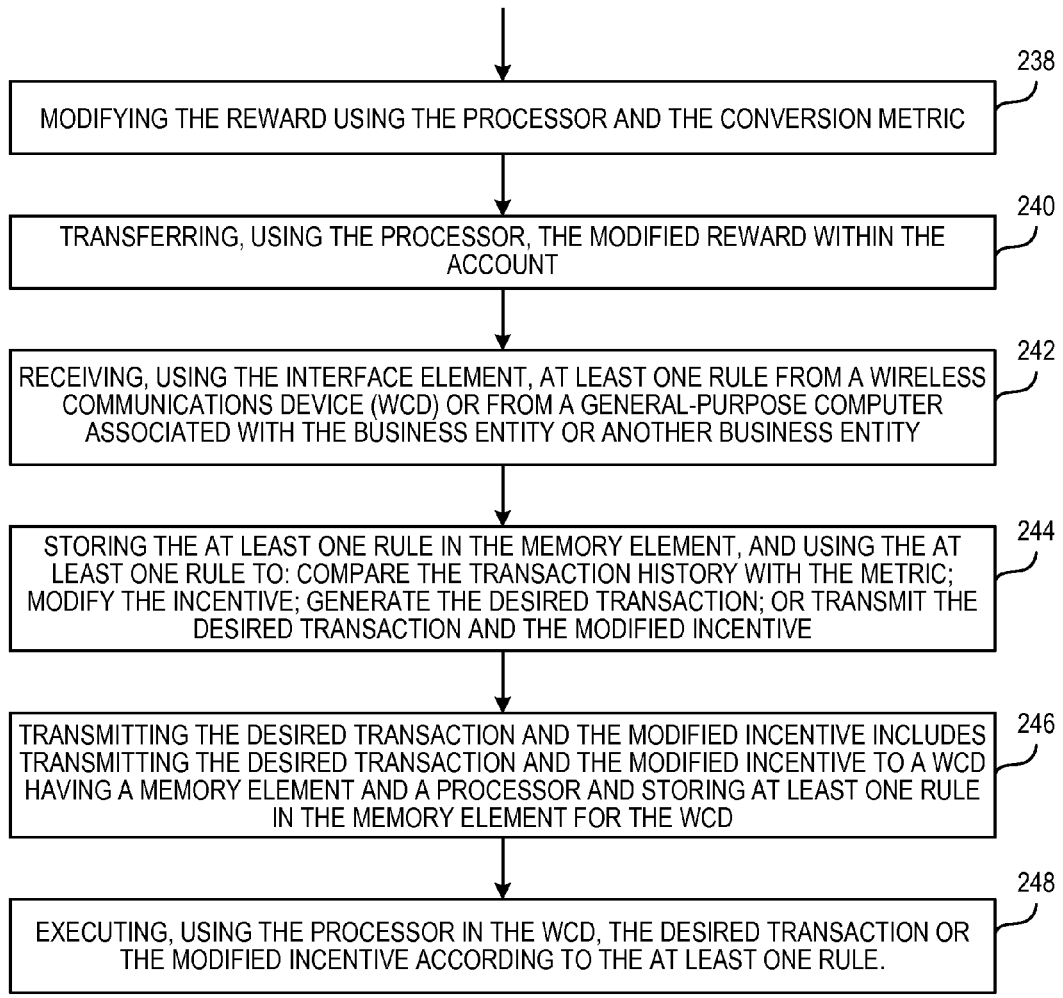

FIG. 2 is a flow chart illustrating a present invention computer-based method for managing an account having at least one sub-account. Although the method in FIG. 2 is depicted as a sequence of numbered steps for clarity, no order should be inferred from the numbering unless explicitly stated. The method starts at Step 200. Step 202 stores, in a memory element for at least one specially-programmed general purpose computer, a transaction history for and account, including a main account and at least one sub-account, with respect to a business entity, an incentive regarding the business entity previously offered to the account, and an artificial intelligence program (AIP). The transaction history includes at least one transaction involving the business entity and the main account, or the business entity and the at least one sub-account; step 204 compares, using a processor in the at least one specially-programmed general purpose computer, the transaction history with a metric; step 206 generates, using the processor and the comparison of the transaction history with the metric, a desired transaction involving the account and the business entity; step 208 modifies the incentive using the processor, the AIP, and the comparison of the transaction history with the metric (rewarding of the modified incentive is conditional upon execution of the desired transaction); and step 210 transmits, using an interface element for the at least one specially-programmed general purpose computer, the desired transaction and the modified incentive for presentation to a holder of the account.

In one embodiment, step 212 determines, using the processor and the AIP, the metric, and stores the metric in the memory element. In another embodiment, step 214 stores, in the memory element, data regarding the account, the data different than the transaction history; and step 216 generates, using the processor, the data, and the AIP, the metric; comparing the transaction history with the metric includes using the data; modifying the incentive includes using the data; generating the desired transaction includes using the data; or transmitting the desired transaction and the modified incentive includes using the data. In a further embodiment, comparing the transaction history with the metric includes using the AIP. In yet another embodiment, generating the incentive comprises using the processor and the AIP.

In one embodiment, step 218 receives, using the interface element, data regarding a transaction, between the business entity and the account, transacted following transmission of the desired transaction and the modified incentive; step 220 compares, using the processor, the data with respect to the desired transaction; and step 222, for compliance of the transaction with the desired transaction, authorizes, using the processor, reward of the modified incentive; or step 224, for non-compliance of the transaction with the desired transaction, further modifies, using the processor and the AIP, the modified incentive according to the comparison of the transaction and the desired transaction.

In one embodiment, step 226 generates, using the processor and the AIP, at least one rule; and step 228 stores the at least one rule in the memory element. Modifying the incentive includes using the at least one rule. In another embodiment, step 230 stores at least one rule in the memory element; and step 232 modifies, using the processor and the AIP, the at least one rule according to the comparison of the transaction history with the metric. Generating the desired transaction includes using the at least one modified rule, or modifying the incentive includes using the at least one modified rule.

In one embodiment, step 234 generates, using the processor, the transaction history, and the AIP, a conversion metric; step 236 receives, using the interface element, a request to transfer a reward within the account; step 238 modifies the reward using the processor and the conversion metric; and step 240 transfers, using the processor, the modified reward within the account.

In one embodiment, step 242 receives, using the interface element, at least one rule from a wireless communications device (WCD) or from a general-purpose computer associated with the business entity or another business entity; step 244 stores the at least one rule in the memory element, and comparing the transaction history with the metric includes using the at least one rule; modifying the incentive includes using the at least one rule; generating the desired transaction includes using the at least one rule; or transmitting the desired transaction and the modified incentive includes using the at least one rule. In another embodiment, transmitting the desired transaction and the modified incentive includes transmitting the desired transaction and the modified incentive to a WCD having a memory element and a processor, and step 246 stores at least one rule in the memory element for the WCD. Step 248 executes, using the processor in the WCD, the desired transaction or the modified incentive according to the at least one rule.

The following describes a present invention method for managing an account having at least one sub-account. Although the method is presented as a sequence of steps for clarity, no order should be inferred from the sequence unless explicitly stated. A first step stores, in a memory element for at least one specially-programmed general purpose computer, a transaction history for the account with respect to a business entity and an artificial intelligence program (AIP), wherein the transaction history includes at least one transaction involving the business entity and the main account or the business entity and the at least one sub-account; a second step compares, using a processor in the at least one specially-programmed general purpose computer, the transaction history with a metric; a third step generates, using the processor, the AIP, and the comparison of the transaction history with the metric, a desired transaction involving the account and the business entity; a fourth step generates, using the processor, the AIP, and the comparison of the transaction history with the metric, an incentive, rewarding of the incentive conditional upon execution of the desired transaction; and a fifth step, transmits, using an interface element for the at least one specially-programmed general purpose computer, the desired transaction and the incentive for presentation to a holder of the account.

The following should be viewed in light of FIGS. 1 and 2 and any discussion provided supra. Although the following non-limiting discussion is directed to a present invention system, it is understood that the discussion also is applicable to a present invention method. System 100 can be described as a reward program for an account including a number of sub-accounts contained under one main account. In one embodiment, each sub-account gains rewards that are tracked under the main account. The system can output special reward offers, for example, incentives 122 and 130, to the main account and sub-accounts to motivate purchasing behavior, for example, to motivate execution of the desired transaction. The system can track the success of the offers, for example via the transaction history or input 134, and automatically modify subsequent desired transactions and incentives based on the success of previous desired transactions and incentives utilizing artificial intelligence, for example, genetic algorithms or AIP 124, and feedback techniques. In another embodiment, rules are used in conjunction with the artificial intelligence.

In one embodiment, the system scores main and sub-accounts and places various accounts into various classes, for example, classification 162. In another embodiment, the processor uses artificial intelligence and the transaction history or classification to identify like accounts and to generate or modify the same or similar desired transactions or incentives for accounts so identified.

In one embodiment, the system is configured to offer up front rewards in exchange for commitments from the main or sub-accounts to execute desired transactions over time. Penalties can be applied to the account if the account is non-compliant with the commitment. In another embodiment, the processor, and in a further embodiment, using the AIP, generates or modifies one or more of the following, for example, using the transaction history:
1. the upfront reward to the main or sub-account holders
2. the required commitment
3. the penalty for non-compliance with the commitment
4. the penalty adjustment
5. the grace period before a penalty is applied to non-compliant behavior In one embodiment, the processor, and in another embodiment, using the AIP, generates or modifies the incentive according to one or more of the following:
1. payment type, for example, credit card usage
2. frequency of transactions, for example, purchases from the business entity
3. number of sub-accounts present 4. check size, for example
5. bonus items in purchase The following is a non-limiting example of the present invention. A main, or master, account holder, Jim, has three sub-account holders registered: Peggy, Sue, and Billy. The system tracks purchasing behavior, for example, using the transaction history, and determines that Jim has shopped with Peggy three times, Sue two times and Billy one time (each shopping event is considered a transaction) in the previous month. The system generates an incentive, for example, incentive 122, and a desired transaction for transmission to Jim and Billy. The desired transaction is three transactions including both Jim and Billy in the next month. The incentive is 200 bonus points for Billy, 200 bonus points for Jim, and 100 bonus points each for Peggy and Sue. The system then determines if Jim and Billy shopped three times in the subsequent month, for example, using input 134 and the transaction history. If Jim and Billy have not executed the desired transaction (three transactions in the subsequent month), the system initiates an iterative process to entice Jim and Billy to comply with the desired transaction(s). For example, the system successively modifies the incentive, for example, generating incentive 130, and successively presents the desired transaction and modified incentive until Jim and Billy comply with the desired transaction. For example, the system successively increases the bonus points offered for compliance with the desired transaction until Jim and Billy execute the desired transaction.

In another non-limiting example of the present invention, the system determines, for example, using the transaction history, that Jim typically has had no more than two sub-account holders present with him during past transactions. To encourage the participation of more sub-accounts, the system generates an incentive, for example, incentive 122, to reward Jim with 200 bonus points if Jim is compliant with a desired transaction consisting of three sub-account holders participating in at least two of Jim's transactions for the next month. The incentive can be modified as described above to encourage Jim's compliance if the system determines that Jim is being non-compliant, for example, by using input 134 and the transaction history.

In one embodiment, credit card embodiment rewards are allocated on a website after execution of a desired transaction. In another embodiment, transferring reward points from a main to a sub-account or from one sub-account to another includes use of a conversion metric, for example, bonus or penalty for transferring. The master account holder, or a sub-account holder with permissions, can log in to a website and allocate reward points earned from making purchases at one or more retailers.

In one embodiment, at a retail buying club, for example, Sam's Club, a master account holder can check in at the door via a hand held device that prompts the master account holder to enter the sub-account holders that are present. The store employee operating the handheld device can verify that the sub-account holders registered as present by the master account holder are actually present. In another embodiment, a fraud system can detect if there are too many sub-accounts in a party based on the transaction amount and adjust reward retroactively.

In one embodiment, a master account holder can use a WCD, for example, a cell phone or other handheld device to process the transaction. If the master account holder is registered in the reward program, a prompt can be sent from the central system to the master account holder device prompting the registration of sub-account holders available. Email notifications and offers can be sent to the master account holder device, and also to devices of sub-account holders. Commonly-owned U.S. patent application Ser. No. 11/985,268, filed Nov. 14, 2007 and commonly-owned U.S. patent application Ser. No. 12/008,428, filed Jan. 11, 2008 are applicable to the operations described above for a WCD.

In one embodiment, for any or all of those instances of a present invention system or method in which an artificial intelligence program or generic algorithm is used, a rule or set of rules, for example, rule 136, is used in conjunction with the artificial intelligence program or generic algorithm. The operation of an artificial intelligence program or generic algorithm with a rule or set of rules is described in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

The present invention leverages existing or future marketing systems, marketing programs, loyalty programs, sponsor programs, coupon programs, discount systems, incentive programs, or other loyalty, marketing, or other similar systems, collectively, "marketing systems" by adding programming logic, self-learning, and self-adaptation to generate or modify a desired transaction or incentive, with respect to managing accounts, for motivating a desired behavior by a customer. The present invention can use any, all, or none of the following considerations as part of generating or modifying the desired transaction, the incentive, or the metric, comparing the transaction history with the metric, or transmitting the desired transaction or incentive, for example, by adding programming logic, self-learning, and self-adaptation as noted supra:

1. One or more business, customer or sponsor objectives, for example, metric 126.
2. Temporal parameters, such as, time of day, day of week, month, or year.
3. Any one or more data or variables available or accessible, including, for example, any customer, business or sponsor information, such as, membership in a loyalty or other marketing program, ordering preferences or history, current sales volumes or budgets or targets, current or planned local, regional or national marketing programs or objectives, device preferences, current speed of service, quality of service or other operating data, budgets, objectives or trends, etc.

In one embodiment, the present invention employs any, all, or none of the following considerations as part of generating or modifying the desired transaction, the incentive, or the metric, comparing the transaction history with the metric, or transmitting the desired transaction or incentive, for example, by adding programming logic, self-learning, and self-adaptation as noted supra:

1. Parameters or data regarding the customer, for example, using the transaction history or data 132. For example, the incentive can be made more attractive to the customer if the customer is a loyal customer or if the business entity wishes to entice the customer to purchase a good seldom ordered by the customer in the past. Proclivity to accept or reject offers of the same or other types. Customer objectives also can be considered.
2. The customer class or type. For example, the incentive can be made more attractive to the customer if the customer is grouped with loyal customers or if the business entity wishes to entice the customer group to purchase a good seldom ordered by the customer group in the past. Customer group objectives also can be considered.

3. Temporal parameters, such as the time of day, week, month, or year. For example, the system can reduce prices in the incentive to encourage sales during times of historic low sales volume or increase prices in the incentive during times of historic high sales volume.
4. The good or service involved in a past, current, or possible future transaction between the customer and the business entity. For example, incentives for items with a short shelf life can be made more attractive to encourage a larger volume of orders for the items.
5. Inventory on hand. For example, incentives can be modified to encourage sale of overstocked items or to maximize profits for items in short supply.
6. Specifics of a transaction. With the use of the AIP, system 100 can automatically, dynamically, and intelligently adapt the desired transaction or the incentive to any parameter associated with a particular transaction. Further, the parameters to which the system is to adapt the price can be automatically, dynamically, and intelligently selected or modified.
7. Physical parameters of the transaction process. For example: order entry device, e.g., point of sales (POS) terminal, kiosk, cell phone, PDA, laptop, IED, etc.; POS device or station, e.g., front counter, drive through, retail station, call center, location on counter, e.g., first station vs. second, third fourth or other station, etc.; output display device (e.g., customer facing display, kiosk, cell phone, PDA, laptop, IED, etc.); or in a quick serve restaurant, the desired transaction or the incentive can be modified to encourage use of self-service kiosks, which may optimize revenue for the business entity, or to discourage use of a point of sales station attended by an employee.
8. Rate of sale of items. For example, prices in the incentive can be increased for goods that are selling rapidly or reduced for goods that are selling slowly.
9. Reservations. For example, to encourage customers to make reservations at a sit down restaurant, prices in the incentive can be reduced for orders placed by customers making reservations.
10. Regular orders. For example, based on the transaction history, prices in the incentive for a restaurant can be reduced for items regularly ordered by a customer or prices can be reduced on items rarely ordered by a customer to encourage the customer to order the rarely ordered items.
11. Employee. For example, to increase prices for incentives handled by an employee with a high success rate of handling such incentives.
12. The nature of the transaction, for example, determining feasible upsells to include in the desired transaction.
13. The location at which the transaction is occurring, for example, lowering the price in the incentive to encourage patronage at a location.
14. Business Information or objectives, for example, metric 126.
15. Sponsor Information or objectives.
16. Marketing Program Type.
17. Opt In Information.
18. Payment method or terms or conditions of payment.
19. Marketing Message Contents.
20. Marketing Offer Objectives.
21. Expected or Actual System Results or tracking data.
22. System determined discounts or other incentives required to achieve desired results.
23. One or more table entries provided by one or more end users, for example, a system administrator.
24. One or more rules provided by one or more end users, for example, a system administrator.
25. One or more genetic algorithms or other AI based rules or determination methods.
26. Point within transaction, e.g., pre-order, mid-order, post order, etc.
27. Loyalty program information.
28. Current store activity, e.g., high or low volumes of transactions.
29. Customer survey information.
30. Financial considerations, such as total current price/profit, total expected price/profit, regular or discounted price, gross margins, profit margins, labor rates, labor availability, marketing funds available, or third party funds available, budget.
31. Expectation of accept or reject of one or more offers in the desired transaction at one or more price points in the incentive.
32. Current, prior or expected level of dilution, gaming, fishing, accretion.
33. Business, customer, or employee target goals.
34. Current or planned local, regional or national or other marketing campaigns, including, for example, product introductions, price or other promotions, print, radio or television or other advertisements, e.g., newspaper coupon drops, etc.
35. Business, customer, sponsor, or system objectives.
36. Business, customer, sponsor, third party, or system information.
37. Any other information, data, rules, system settings, or otherwise available to the marketing system or disclosed invention or the POS system or other system designed to deliver one or more marketing messages, offers, or coupons, etc.
38. Any combination or priority ranking of any two or more of the foregoing.

In one embodiment, marketing messages, content, desired transactions, metrics, histories, incentives, or other parameters, are created or maintained centrally or in a distributed network, including, for example, locally. Such management may be accomplished via any applicable means available, including, for example, making use of existing, e.g., off the shelf or customized tools that provide for such creating, management or distribution.

In another embodiment, in an effort to further enhance generating or modifying the desired transaction, the incentive, or the metric, comparing the transaction history with the metric, or transmitting the respective data, or to otherwise improve one or more aspects of the present invention, the invention may access certain information from existing systems, including, for example, existing POS databases, such as customer transaction data, price lists, inventory information or other in or above store, for example, location data, including, but not limited to data in a POS, back office system, inventory system, revenue management system, loyalty or marketing program databases, labor management or scheduling systems, time clock data, production or other management systems, for example, kitchen production or manufacturing systems, advertising creation or tracking databases, including click through data, impressions information, results data, corporate or store or location financial information, including, for example, profit and loss information, inventory data, performance metrics, for example, speed of service data, customer survey information, digital signage information or data, or any other available information or data, or system settings data.

In one embodiment, each location associated with the present invention establishes its own rules, uses its own AIP or generic algorithm, or learns from local customer behavior or other available information. In another embodiment, the present invention shares some or all available information or results data among any two or more or all locations or locations that fall within a given area, region, geography, type, or other factors, such as customer demographics, etc., and makes use of such information to improve the present invention's ability to perform present invention operations described supra and infra.

For example, when using an AI based system, such as disclosed in commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007," one location may discover or otherwise determine that a certain type or class of desired transaction or incentive is particularly effective. By sharing such information among other locations, for example, similar locations, the present invention can begin to make use of the same or similar desired transactions or incentives in other generally similar locations or with similar customers or classifications of customers so as to improve the performance of one or more other such locations or all locations. In this fashion, the present invention can learn which desired transactions or incentives more quickly or generally achieve the desired results or improve trends towards such results. Likewise, the present invention can more quickly determine which desired transactions or incentives do not yield the desired results or determine how long such desired transactions or incentives are required to achieve the desired results.

In a further embodiment, desired transactions or incentives are provided or subsidized by one or more third parties, including, for example, third party sponsors. For example, a vendor supplying an item in a desired transaction could subsidize an incentive to encourage acceptance of the item. In another example, such an offer may be partially or fully subsidized by an unrelated third party sponsor. For example, as part of a desired transaction, a telecommunications company offers to view an advertisement for the telecommunications company or fill out a survey or perform some other action or accept a subsequent or related optional or required offer, etc.

In one embodiment, customers are grouped by the processor according to similarities in transaction history or other customer information, for example, using and history 110 or data 132. The system generates or modifies the desired transaction, the incentive, or the metric, compares the transaction history with the metric, or transmits the desired transaction or incentive for use with the grouped customers.

In one embodiment, the operations of the processor and the AIP, described supra and infra, include the generation of executables as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, the present invention generates or modifies the desired transaction, the incentive, or the metric, compares the transaction history with the metric, or transmits the respective data based upon other performance data or results, for example, the transaction history. In another embodiment, the present invention determines the impact of transaction histories, account data, metrics, desired transactions, incentives, or presentations on the ability or proclivity of an employee or customer to game or fish the present invention. The system avoids or ceases transaction histories, account data, metrics, desired transactions, incentives, or presentations and/or changes the type of transaction histories, account data, metrics, desired transactions, incentives, or presentations provided or suppressed. In one embodiment, one or more of the above operations are performed using the AIP.

In one embodiment, transaction histories, account data, metrics, desired transactions, incentives, or presentations vary from employee to employee, from customer to customer, from account to account, or from time to time, or one or more of these may be consistent regardless of the employee, customer, account, or time or other information. In a another embodiment, where transaction histories, account data, metrics, desired transactions, incentives, or presentations vary, such transaction histories, account data, metrics, desired transactions, incentives, or presentations are determined via any applicable means and using any available information to make such determination, including, for example, any available customer, account, business, or sponsor information or any one or more customer, account, business, or sponsor objectives or any combination of the forgoing. In a further embodiment, transaction histories, account data, metrics, desired transactions, incentives, or presentations are further determined or modified based upon information or needs or business objectives of one or more suppliers or competitors of such suppliers. For example, if a WCD is within a geographical area for a location selling competing items A and B, a desired transaction and incentive are generated and transmitted for one or both of the items and vendors for the items underwrite the cost for the price to the business entity. In one embodiment, one or more of the above operations are performed using the AIP.

In one embodiment, a present invention system generates, modifies, or uses transaction histories, account data, metrics, desired transactions, incentives, or presentations based upon current or previous buying habits or any other available information regarding a customer. If for example, an end user is a loyal customer for item A, the present invention can increase the price in the incentive for item A or decrease the price in the incentive for a different item depending upon any known factors, for example, did the customer receive or act upon an offer for item B. If the customer did receive or act upon a reminder for item B, in another embodiment, the present invention reduces a cost in the incentive for item A as a blandishments to purchase item A instead of item B, or matches or beats a price for item B, or queries such loyal (or other) customer to determine what price such customer would require to purchase item A. In this fashion a competitive environment is created.

In one embodiment, the end user of a present invention system modifies the rules or method of operation so as to favor itself. For example, in the previous example, if the producer of item A were the sole end user of the present invention, the producer may choose to not share any part or all of any such customer information or may use knowledge of any reminder regarding item B to its benefit. In another example, if a grocery chain was the sole end user of the present invention, the end user may choose to provide equal access to the present invention or favor one or more of its suppliers based upon any one or more of its business objectives, for example, the profitability or perceived or actual quality or consistency or pricing of such one or more suppliers. In one embodiment, one or more of the above operations are performed using the AIP.

In one embodiment, in order to receive a desired transaction and incentive, account holders, for example, existing or prospective customers are required to opt in to a cellular marketing program or some other loyalty program indicating their desire or providing permission for such marketing system or the business entity to send one or more such desired transaction and incentive. In this fashion, only those interested in such communications will be sent such communications.

In a further embodiment, the desired transaction or incentive is modified for prospective customers having an identity previously provided by an existing customer, as described in commonly-owned U.S. patent application Ser. No. 12/217,863, titled: "SYSTEM AND METHOD FOR PROVIDING INCENTIVES TO AN END USER FOR REFERRING ANOTHER END USER," inventors Otto et al., filed Jul. 9, 2008, which application is incorporated by reference herein. For example, if an existing quick service restaurant chain customer provides one or more prospective customer's identity, when such prospective customer is identified during a transaction at a quick service restaurant chain's participating locations, the present invention generates or modifies the desired transaction or incentive or presentation of the desired transaction or incentive to encourage participation in the program and provides the identity of the referring party along with such desired transaction or incentive. In one embodiment, one or more of the above operations are performed using the AIP.

In one embodiment, the present invention improves results over time or with use of the invention. Such improvement or optimization can be accomplished via any means necessary including any of several methods well known in the art or as disclosed by applicants and incorporated herein by reference, including, for example, commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007; commonly-owned U.S. patent application titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008; and commonly-owned U.S. patent application titled: "METHOD AND APPARATUS FOR GENERATING AND TRANSMITTING AN ORDER INITIATION OFFER TO A WIRELESS COMMUNICATIONS DEVICE," inventors Otto et al., filed May 2, 2008. For example, statistical methods can be used to determine which transaction histories, account data, metrics, desired transactions, incentives, or presentations generally yield the desired or optimal or generally better results, or such results may be determined using artificial intelligence, for example, one or more genetic algorithms, or a present invention administrator/operator can review results reports and then provide manual weighting criteria to further define or control the present invention, or a combination of these and other well known methods may be employed in any combination or in any order or priority.

In one embodiment, a present invention incentive includes a discount. Such discounts can be associated or applied to specific items, or to an entire order. In one embodiment, discounts are determined based upon rules established by management of the present invention or as established or modified from time to time by any authorized personnel, or may be initially established or modified using a learning system, e.g., a genetic algorithm. In any such case, the present invention can make use of any or all available information, including, but not limited to transaction history and customer information. Discounts can be designed to maximize, minimize or optimize any one or more business or customer objectives as desired or indicated. In another embodiment, the discount, if any, is presented to the customer as a percentage discount or as a cents or other amount off discount. In one embodiment, one or more of the above operations are performed using the AIP.

In one embodiment, discounts in incentives are used/tried relatively sparingly to determine the price elasticity of customers, both as a whole and/or by class, group, demographics, type or order contents, base order amounts, and/or specific customer's buying habits and acceptance/rejection information. In this fashion, the present invention can, over time, yield optimal results by learning or otherwise determining what price reductions, if any, are required given the known information. For example, if a sub-account rarely transacts with the main account, the present invention could include a price offering a 10% discount in the incentive if the sub-account and the main account are involved in the same transaction. If the account holders reject such offer, the present invention could offer a larger discount in the incentive, for example, for a 20% discount. Once the present invention determines account holder price points, and/or holders become habituated to executing the desired transaction, the present invention can reduce or eliminate related discounts or other incentives. In one embodiment, one or more of the above operations are performed using the AIP.

In one embodiment, the present invention, having acquired data regarding customer price elasticity and other information, uses such information to determine other prices for the same or generally similar customers, e.g., other customers who purchase one item but not typically another. In another embodiment, using such logic, the present invention determines classifications of customers and leverage use of such information by providing a desired transaction or incentive that is also optimized from the location or location management perspective/objectives. In one embodiment, one or more of the above operations are performed using the AIP.

In one embodiment, an administrator can add or change or otherwise modify the previous listing, or data, or determine the order of priority or preference of each such discrimination factors or preferences or data, including, for example, location, payment or device, ranking each in order of such preference or providing table, rules or other entries to provide or assist or to support determining which are preferred or the amount of incentive available or increased or decreased incentive, as a percentage or absolute or relative or other dollar or other calculation method to determine what price modifications, if any to make, at which locations, devices or payment methods or other discriminating factors, for example, customer or business preferences or customer, business, sponsor or other entity information, objectives, rules or other available information or rules or system settings. By providing or otherwise manually or automatically determining such rankings, the disclosed invention can initially or continuously evaluate potential pricing and modify such pricing or provide other incentives to drive a desired percentage of business or customer transactions to one or more particular devices, locations or payment methods. In one embodiment, one or more of the above operations are performed using the AIP.

In one embodiment, the present invention provides such incentives initially, or on an ongoing basis or only until certain objectives are achieved or certain customers or all customers are generally habituated to compliance, for example, with a business objective such as a minimum check size, after which, in certain embodiments, the present invention may cease, temporarily or permanently making such price incentives based upon such discriminating factors, or may reduce the difference in incentives, or may only periodically provide such full discounts or reduced discounts so as to reinforce such behavior. In another embodiment, a system administrator or other end user establishes such rules or conditions. In one embodiment, one or more of the above operations are performed using the AIP.

In one embodiment, the present invention makes such determinations using an automated means. Such automated means includes, for example, a system that periodically or generally continuously tests different transaction histories, account data, metrics, desired transactions, incentives, or presentations or other methods, for example, user interfaces, or other benefits or incentives, and based upon such testing, determine which transaction histories, account data, metrics, desired transactions, incentives, or presentations or other benefits yield the desired compliance, for example, with a business objective such as a preferred payment method. Such automated system may periodically cease providing such incentives once it is determined that the desired customer behavior has been established, habituated or otherwise persists without need for such continued incentive. If such system subsequently determines that the desired behavior has ceased or fallen below a desired level, such system can then reinstate an appropriate incentive. When reinstating such incentive, for example, via transaction histories, account data, metrics, desired transactions, incentives, or presentations, the present invention can return to previously successful levels or can provide different transaction histories, account data, metrics, desired transactions, incentives, or presentations, on a temporary, periodic or permanent basis. Such reinstatement may be provided for all customers, certain customers, classes of customers, or only those customers that have ceased or have generally reduced their frequency of desired behavior. In one embodiment, one or more of the above operations are performed using the AIP.

In one embodiment, the present invention tests transaction histories, account data, metrics, desired transactions, incentives, or presentations or provides certain pricing on a periodic basis within a single location or among a plurality of locations so as to determine the extent or requirement regarding any such transaction histories, account data, metrics, desired transactions, incentives, or presentations or other benefits. For example, by testing incentive levels, the present invention can determine the level of incentive needed to attain a business goal, or such a system can further determine the extent of any gaming, dilution, diversion or accretion. By alternating offering and not offering incentive modification or by testing various levels of incentives, the present invention can better determine the optimal incentive, discount or benefits required, if any, to achieve the desired results, while minimizing or mitigating any undesirable effects of using or deploying such system. Such testing can be accomplished via any applicable or available means, including those previously disclosed by applicants herein and within the referenced applications, or randomly or using rules or AI based systems. By periodically testing or making changes to such transaction histories, account data, metrics, desired transactions, incentives, or presentations or benefits, the present invention can continually strive to achieve the optimal mix and level of transaction histories, account data, metrics, desired transactions, incentives, or presentations. By combining the use of one or more of a table, rules or AI based system, including, for example, as disclosed in the applications incorporated by reference herein, a more effective, responsive, adaptive, and dynamic marketing system may be developed and deployed that achieves optimal or nearly optimal results over both the short and long term.

In one embodiment, the present invention tests customers of one or more locations using, an incentive, for example, discounted pricing, while maintaining the regular prices at one or more other locations. By comparing the results data from such test and control groups of locations, the present invention can better determine which incentives are accretive or provide net benefit or are subject to gaming, fishing or other fraudulent or undesirable activities. Such testing can be performed within a single unit as well, by periodically offering such incentives to the same or similar customers or by randomly providing or not providing such incentives.

In one embodiment, the present invention makes use of a combination of such testing methodologies in order to best determine which desired transactions or incentives yield optimal or the best results given the present invention information, parameters or any one or more customer, business, sponsor or present invention objectives. For example, the present invention tests in a single or group of stores certain new or untested desired transactions or incentives, and, combines such test with a periodic modification of desired transactions or incentives, for example, toggling, between higher and lower price discounts, which toggling, may be random, 50/50, or may be intelligently determined, for example, using the AIP, based upon system information, and continue such test for a period of time, for example, one month, while comparing results of such tests with a similar number of stores in a control group, and then, switch the process, for example, test within the original control group and stop offering modified incentives within the original test group. In this fashion the present invention determines the effects of desired transaction or incentive modifications and the effect of such modifications on customers, customer buying habits, store or business results, or any other measures, including, for example, testing for dilution, diversion, accretion, gaming or fishing. In one embodiment, one or more of the above operations are performed using the AIP.

In one embodiment, a system administrator is able to enter or modify or delete or otherwise provide transaction histories, account data, metrics, desired transactions, incentives, or presentations using an interface provided for such purposes. When establishing messages or content of transaction histories, account data, metrics, desired transactions, incentives, or presentations, such administrator or other end user may be further permitted to designate which transaction histories, account data, metrics, desired transactions, incentives, or presentations are to be generally used when using a particular type of communications. For example, one type of transaction history, account data, metric, desired transaction, incentive, or presentation may be designated for use when communicating via cell phone and another transaction history, account data, metric, desired transaction, incentive, or presentation used for email and still other versions for each or all of the other various methods of communications. In another embodiment, the present invention tests each transaction history, account data, metric, desired transaction, incentive, or presentation with each such communications method to determine, partially or wholly, which transaction history, account data, metric, desired transaction, incentive, or presentation yields the best or optimal results over time or based upon any available information, including, for example, any available or otherwise accessible customer, business or sponsor information or objectives or by tracking actual activities and results or changes in behavior as expected or predicted by customers or other end users or classes or categories of uses or by device, location or payment method. In a further embodiment, one or more of the above operations are performed using the AIP.

Figure 3:
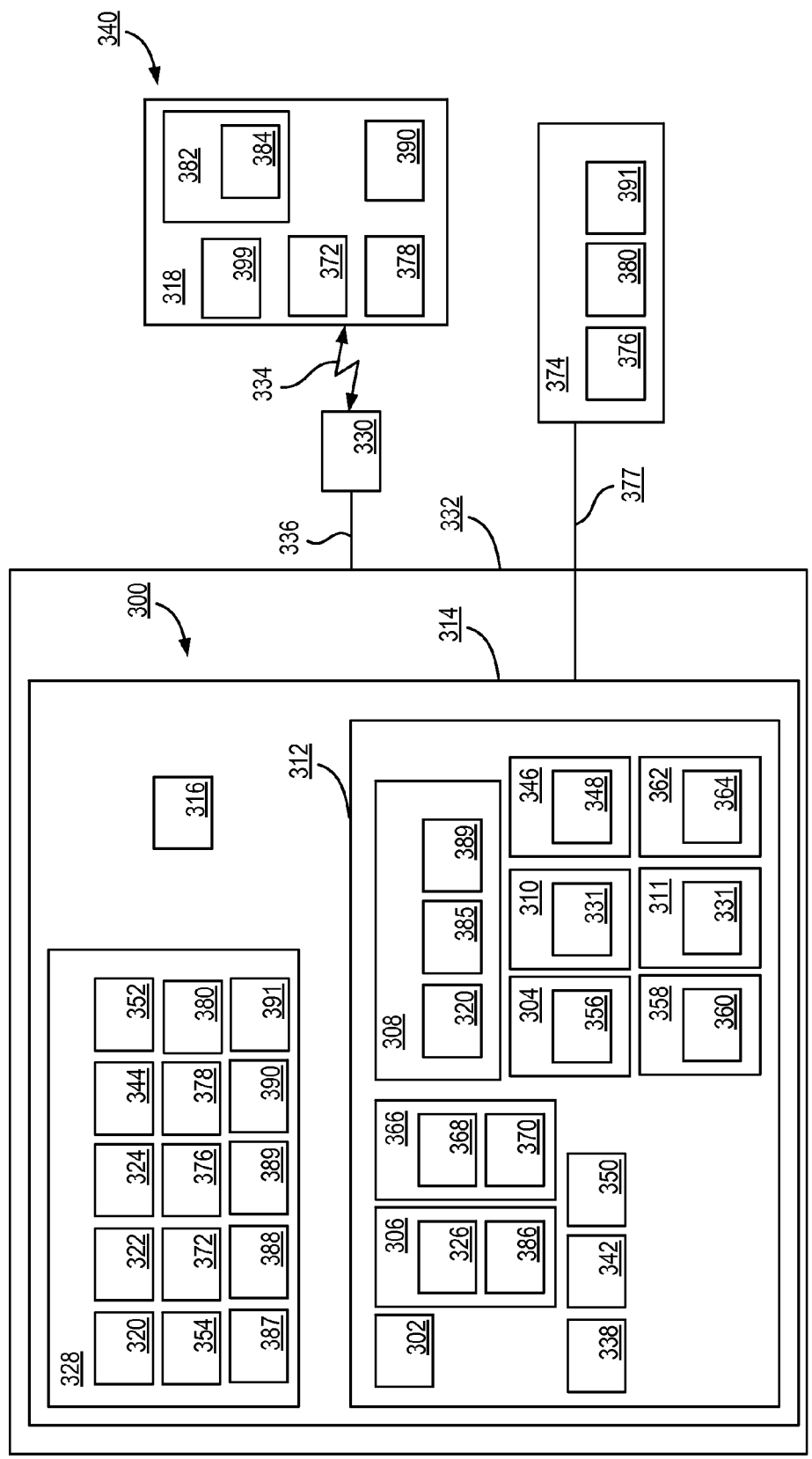
FIG. 3 is a schematic block diagram of a present invention apparatus for generating and transmitting an order initiation offer to a wireless communications device (WCD)

FIG. 3 is a block diagram for an example system 300 for generating and transmitting an order initiation offer to a wireless communications device (WCD). System 300 includes: identification element 302, eligibility element 304, executable element 306, offer element 308, transceiver element 310, and order initiation element 311, all located in processor 312 of at least one specially programmed general-purpose computer 314. Alternately stated, elements 302, 304, 306, 308, 310, and 311, and any other elements described as being in the processor are functions of the processor or are functions carried out by the processor.

Element 302 identifies, using interface element 316, WCD 318. The eligibility element determines if the WCD is eligible to receive order initiation offer 320. Offer 320 is an offer that is made that when accepted (further described below) initiates a transaction. The executable element is arranged to generate, using one or both of rules 322 and artificial intelligence program 324, at least one executable 326. The set of rules and the artificial intelligence program are stored in memory unit 328. In one embodiment, the executable is generated as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, computer 314 receives at least one modifying rule 372 from a WCD and stores the rule in memory 328. In another embodiment, the WCD is WCD 318. The executable element modifies executable 326 using rule 372. The WCD generates rule 372, and the executable element modifies executable 326 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, computer 374, separate from computer 314, transmits modifying rule 376 to computer 314. Computer 374 can be in location 332 or can be in a different location. Computer 374 can be associated with a business entity associated with location 332 or can be associated with a different business entity. Connection 377 between computers 314 and 374 is any type known in the art. In another embodiment (not shown), multiple computers 374 are included and respective computers among the multiple computers can be associated with the same or different business entities. Computer 314 stores modifying rule 376 in memory 328. Element 306 modifies executable 326 using rule 376. Computer 374 generates rule 376, and element 306 modifies executable 326, respectively, as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

The executable is directed toward determining an offer that is most acceptable to an end user of the WCD and best meets prescribed criteria of the entity making the offer. For example, acceptability could be based on price, free items, or other criteria mentioned below. Rules 322 or program 324 are used to find the appropriate combination of acceptability and entity criteria.

The offer element generates, for an eligible WCD and using the at least one executable, an appropriate order initiation offer 320. In general, the core of offer 320 is shaped by, determined by, or consists of executable 326. The transceiver element transmits, using the interface element, the appropriate order initiation offer 320 to wireless communications network 330 for transmission to the WCD. The transceiver element also is arranged to receive, via the interface element, response 331, including an order, from the WCD. Element 311 initiates fulfillment of the order by any means known in the art.

The interface element can connect with the device, system, or network external to the computer, for example, network 330, using any means known in the art, including, but not limited to a hardwire connection, an optical connection, an Internet connection, or a radio frequency connection. Processor 312 and interface element 316 can be any processor or interface element, respectively, or combination thereof, known in the art.

Computer 314 can be any computer or plurality of computers known in the art. In one embodiment, the computer is located in a retail location with which system 300 is associated, for example, location 332. In another embodiment (not shown), all or parts of the computer are remote from retail locations with which system 300 is associated. In a further embodiment, computer 314 is associated with a plurality of retail locations with which system 300 is associated. Thus, the computer provides the functionality described for more than one retail location. In one embodiment, offer 320 is for an item, good, or service provided by the entity associated with location 332.

A WCD is defined supra. WCD 318 can be any WCD known in the art. In one embodiment, WCD 318 is owned by, leased by, or otherwise already in possession of the end user when system 300 interfaces with the WCD. In the description that follows, it is assumed that the WCD is owned by, leased by, or otherwise already in possession of the end user when system 300 interfaces with the WCD. In general, the WCD communicates with a network, for example, network 330, via radio-frequency connection 334. Network 330 can be any network known in the art. In one embodiment, the network is located outside of the retail location, for example, the network is a commercial cellular telephone network. In one embodiment (not shown), the network is located in a retail location, for example, the network is a local network, such as a Bluetooth network. The interface element can connect with network 330 using any means known in the art, including, but not limited to a hardwire connection, an optical connection, an Internet connection, or a radio frequency connection. In the figures, a non-limiting example of a hardwire connection 336 is shown. In one embodiment, device 318 is connectable to a docking station (not shown) to further enable communication between device 318 and system 300. Any docking station or docking means known in the art can be used. That is, when the device is connected to the docking station, a link is established between the device and system 300.

In a first embodiment, system 300 includes location element 338 in the processor, which determines, using the interface element, location 340 for the WCD. The location of the WCD can be determined using any means known in the art, including, but not limited to, GPS technology and information from network 330. Then, the eligibility element determines eligibility in response to location 340, the executable element generates the at least one executable responsive to location 340, or the offer element generates an appropriate order initiation offer responsive to location 340. It should be understood that any combination of the eligibility, executable, and offer elements can operate responsive to location 340. Any criteria known in the art can be used to control the operation of the eligibility, executable, and offer elements responsive to location 340. For example, the elements can operate when the WCD is within a certain specified distance from one or more retail locations, for example, location 332; the elements can operate to generate offer 320 for a specific retail location according to location 340; or the elements can operate to generate offer 320 offering options with respect to a plurality of retail locations (not shown) based on respective distances of the WCD from the plurality of locations.

In a second embodiment, system 300 includes transaction element 342 that accesses transaction history 344, stored in the memory unit, for the WCD or an end user (not shown) associated with the WCD. In one embodiment, the history is stored in a separate computer system (not shown) accessed by system 300. The eligibility element determines eligibility in response to history 344, the executable element generates the at least one executable responsive to history 344, or the offer element generates an appropriate order initiation offer responsive to history 344. It should be understood that any combination of the eligibility, executable, and offer elements can operate responsive to history 344.

Any criteria known in the art can be used to control the operation of the eligibility, executable, and offer elements responsive to history 344. For example, executable 326 can be generated in response to trends noted in the history. The executable can be directed to a continuation of the trend or can derive variants from the trend that may be acceptable to the end user and in the interest of the retail location. Further, the continuation or variants can be aligned with parameters defined for the retail location. For example, the executable can be addressed to a desired promotion, conditions at the retail location, such as stock on hand, or attempts to increase a total bill for the end user.

In another embodiment, history 344 includes searches made using the WCD or communications by the WCD. Alternately stated, system 300 is linked to search browsers associated with the WCD. Any type of search or WCD communication known in the art can be included in history 344. For example, if the WCD has been used to search for products typically available at a retail location similar to location 332, the offer element generates offers for transmission to the WCD when the WCD is within a specified location of such a retail location, for example, location 332. As another example, the communications can be, but are not limited to, telephone calls or email messages to a specific retail location or to a category of retail locations. As another example, if history 344 shows that the WCD has communicated with location 332, then eligibility or the offer can be tailored in response to this information.

In a third embodiment, the eligibility element determines eligibility in response to a time of day, in general, the time of day when the WCD is identified, the executable element generates the at least one executable responsive to the time of day, or the offer element generates an appropriate order initiation offer responsive to the time of day. It should be understood that any combination of the eligibility, executable, and offer elements can operate responsive to the time of day. Any criteria known in the art can be used to control the operation of the eligibility, executable, and offer elements responsive to the time of day. For example, executable 326 can be generated in response to trends for an end user with respect to the time of day or with parameters for the retail location associated with the time of day. The executable can be directed to a continuation of the trend or can derive variants from the trend that may be acceptable to the end user. Further, the continuation or variants can be aligned with parameters defined for the retail location. For example, the executable can be addressed to a desired promotion, conditions at the retail location, such as stock on hand, or attempts to increase a total bill for the end user.

In a fourth embodiment, the eligibility element determines eligibility in response to the day of the week, the executable element generates the at least one executable responsive to the day of the week, or wherein the offer element generates an appropriate order initiation offer responsive to the day of the week. It should be understood that any combination of the eligibility, executable, and offer elements can operate responsive to the day of the week. Any criteria known in the art can be used to control the operation of the eligibility, executable, and offer elements responsive to the day of the week. For example, executable 326 can be generated in response to trends for an end user with respect to the day of the week or with parameters for the retail location associated with the day. In general, this embodiment operates similar to the embodiment directed to the time of day.

In a fifth embodiment, system 300 includes volume element 346, in the processor, which determines transaction volume 348 for at least one retail location, for example, location 332. Element 346 can use any means known in the art to determine volume 348. In one embodiment, element 346 interfaces with another computer system (not shown) associated with location 332 to determine or obtain volume 348. The eligibility element determines eligibility in response to volume 348, the executable element generates the at least one executable responsive to volume 348, or the offer element generates an appropriate order initiation offer responsive to volume 348. It should be understood that any combination of the eligibility, executable, and offer elements can operate responsive to volume 348. Any criteria known in the art can be used to control the operation of the eligibility, executable, and offer elements responsive to volume 348. For example, executable 326 can be generated to create offers that are higher profit (may be less acceptable to an end user) if the volume is high or can generate lower profit (more acceptable offers) if the volume is low. Also, executable 326 can be refined to address respective volume data for various products or groups of products, rather than overall volume.

In a sixth embodiment, system 300 includes order element 350, in the processor, which determine whether an order (not shown) has been placed previously using the WCD. In one embodiment, element 350 interfaces with another computer system (not shown) associated with location 332 to determine or obtain information regarding a previous order. Then, the eligibility element determines eligibility in response to whether an order has been placed previously using the WCD, the executable element generates the at least one executable responsive to whether an order has been placed previously using the WCD, or the offer element generates an appropriate order initiation offer responsive to whether an order has been placed previously using the WCD. It should be understood that any combination of the eligibility, executable, and offer elements can operate responsive to whether an order has been placed previously using the WCD. Any criteria known in the art can be used to control the operation of the eligibility, executable, and offer elements responsive to whether an order has been placed previously using the WCD. For example, executable 326 can be generated to present more acceptable (perhaps lower profit) offers to first time orders from the WCD or can present more acceptable offers to reward continued use of the WCD to place orders.

In a seventh embodiment, element 350 determines whether an order has been placed previously using the WCD during a specified time of day or a specified day of the week. Then, the eligibility element determines eligibility in response to whether an order has been placed previously using the WCD during a specified time of day or a specified day of the week, the executable element generates the at least one executable responsive to whether an order has been placed previously using the WCD during a specified time of day or a specified day of the week, or the offer element generates an appropriate order initiation offer responsive to whether an order has been placed previously using the WCD during a specified time of day or a specified day of the week. It should be understood that any combination of the eligibility, executable, and offer elements can operate responsive to whether an order has been placed previously using the WCD during a specified time of day or a specified day of the week. Any criteria known in the art can be used to control the operation of the eligibility, executable, and offer elements responsive to whether an order has been placed previously using the WCD during a specified time of day or a specified day of the week. This embodiment is a refinement of the previous embodiment. For example, additional temporal criteria are added to the generation of the executable.

In an eighth embodiment, the eligibility element generates, using at least one of set of rules 352 and artificial intelligence program 354, at least one executable 356. Set of rules 352 and artificial intelligence program 354 are stored in the memory unit. The eligibility element is arranged to determine if the WCD is eligible to receive an order initiation using executable 356. In one embodiment, executable 356 is generated as disclosed by commonly-owned U.S. patent application Ser. No. 11/983,679: "METHOD AND SYSTEM FOR GENERATING, SELECTING, AND RUNNING EXECUTABLES IN A BUSINESS SYSTEM UTILIZING A COMBINATION OF USER DEFINED RULES AND ARTIFICIAL INTELLIGENCE," inventors Otto et al., filed Nov. 9, 2007.

In one embodiment, computer 314 receives at least one modifying rule 378 from a WCD and stores the rule in memory 328. In another embodiment, the WCD is WCD 318. Element 304 modifies executable 356 using rule 378. The WCD generates rule 378 and element 304 modifies executable 356 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, computer 374 transmits at least one modifying rule 380 to computer 314. Computer 314 stores modifying rule 380 in memory 328. Element 304 modifies executable 356, using rule 380. Computer 374 generates rule 380, and element 304 modifies executable 356, respectively, as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, the eligibility element determines if an end user associated with the WCD is eligible for the order initiation offer. That is, the criteria with respect to eligibility are with respect to an end user of the WCD. In another embodiment, system 300 includes receiving element 358, in the processor, arranged to receive, using the interface element, transmission 360 from the WCD via the communication network. The identification element identifies the WCD in response to the transmission, using any means known in the art. That is, rather than system 300 contacting the WCD to initiate the operations noted above, system 300 initiates the operations after being contacted by the WCD.

In a further embodiment, system 300 includes inventory element 362, in the processor, which obtains inventory information 364. In general, information 364 related to inventory availability, for example, an inventory of product or services in stock or ready for purchase at the retail location. For example, in a restaurant, information 364 might be regarding the number and type of already-prepared breakfast items at the restaurant. In a location selling durable goods, such as appliances, the information could be regarding whether various of the durable goods are in stock at the retail location. In yet another embodiment, element 362 interfaces with another system, for example, a local or centralized computer system associated with operations at the retail location, to obtain information 364, or to obtain data to determine information 364. In a still further embodiment, element 362 compiles the data necessary to determine information 364. For example, operations at the retail location are processed by computer 314. The eligibility element determines eligibility in response to inventory information, for example, if there is a surplus of items on hand, the requirements for eligibility can be loosened, the executable element generates the at least one executable responsive to inventory information, or the offer element generates an appropriate order initiation offer responsive to inventory information, for example, if the supply of items on hand is low, offers for that item can be made more profitable for the retail location.

In one embodiment, system 300 includes registration element 366, in the processor, which communicates with the WCD through the transceiver element. Element 366 transmits information 368 regarding registration of a WCD with system 300, for example, soliciting registration, providing instructions for registering, and promoting registration. Element 366 also receives registration information 370 for the WCD.

In one embodiment, memory element 382 in WCD 318 stores at least one rule 384. Processor 399 in the WCD implements offer 320 according to rule 384. The WCD generates rule 384, and operates on offer 320 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment the offer element determines redemption rate 385 for offer 326. The executable element generates at least one executable 386, using the redemption rate, and at least one of set of rules 387 or artificial intelligence program 388 stored in memory unit 328. The offer element generates appropriate order initiation offer 389 using executable 386, and the transmission element transmits, using the interface element, offer 389 to the wireless communications network for transmission to the WCD.

In another embodiment, the offer element modifies, using the redemption rate, rules 322 or artificial intelligence program 324 to create rules 387 or artificial intelligence program 388, respectively.

In a further embodiment, offers 320 and 389 are transmitted to the WCD regardless of the location of the WCD with respect to a business location, for example, location 332, and stored in memory 382. The location element determines, using the interface element, when the WCD is within a specified distance (not shown) of the business location and retrieves, using the interface element, offer 320 or 389 from memory 382 for presentation, for example, on a point of sale station for the business location. In another embodiment, offers 320 and 389 are stored in memory 328 until the location element, using the interface element, identifies the WCD as being within a specified distance (not shown) of the business location, at which time offers 320 and 389 are transmitted to the WCD.

In one embodiment, computer 314 receives at least one modifying rule 390 from a WCD and stores the rule in memory 328. In another embodiment, the WCD is WCD 318. Element 306 modifies executable 386 using rule 390. The WCD generates rule 390 and element 306 modifies executable 186 as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

In one embodiment, computer 374 transmits at least one modifying rule 391 to computer 314. Computer 314 stores modifying rule 391 in memory 328. Element 306 modifies executable 386, using rule 391. Computer 374 generates rule 391, and element 306 modifies executable 386, respectively, as described in U.S. patent application Ser. No. 12/151,043, titled: "METHOD AND SYSTEM FOR CENTRALIZED GENERATION OF BUSINESS EXECUTABLES USING GENETIC ALGORITHMS AND RULES DISTRIBUTED AMONG MULTIPLE HARDWARE DEVICES," inventors Otto et al., filed May 2, 2008.

It should be understood that various storage and removal operations, not explicitly described above, involving memory 328 and as known in the art, are possible with respect to the operation of system 300. For example, outputs from and inputs to the general-purpose computer can be stored and retrieved from the memory elements and data generated by the processor can be stored in and retrieved from the memory.

It should be understood that the locating element can determine the distance of the WCD from more than one business, or retail, location. It also should be understood that the offer element can generate and transmit more than one offer for a business location and can generate respective offers for more than one business location or entity. It also should be understood that a plurality of distance and offer criteria and metrics can be used by the location and offer elements to determine a distance to use and to generate an offer, respectively. The criteria and metrics can include, but are not limited to, information specific to operations at a particular business entity or business location, geographical information, and temporal aspects, such as time of day.

It should be understood that system 300 can be operated by the same business entity operating or owning a business location using the system, or can be operated by a third party different than the business entity operating or owning the business location using the system. In one embodiment, a third party operates system 300 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

It should be understood that system 300 can be integral with a computer operating system for a business location, for example, location 332 or with a business entity operating the business location. It also should be understood that system 300 can be wholly or partly separate from the computer operating system for a retail location, for example, location 332, or with a business entity operating the business location.

It should be understood that although individual rule sets and artificial intelligence programs are discussed, the individual rule sets and AI programs can be combined into composite rules sets or artificial intelligence programs. Any combination of individual rule sets or artificial intelligence programs is included in the spirit and scope of the claimed invention. For example, rules 322 and 352 can be a single set of rules (not shown) or artificial intelligence programs 324 and 354 can be a single program (not shown).

It should be understood that the examples above regarding executables are non-limiting, are meant to provide only a broad overview, and do not address the number, complexity, structure, or interrelationships of the operations included in the actual generation of the executables.

Figure 4:
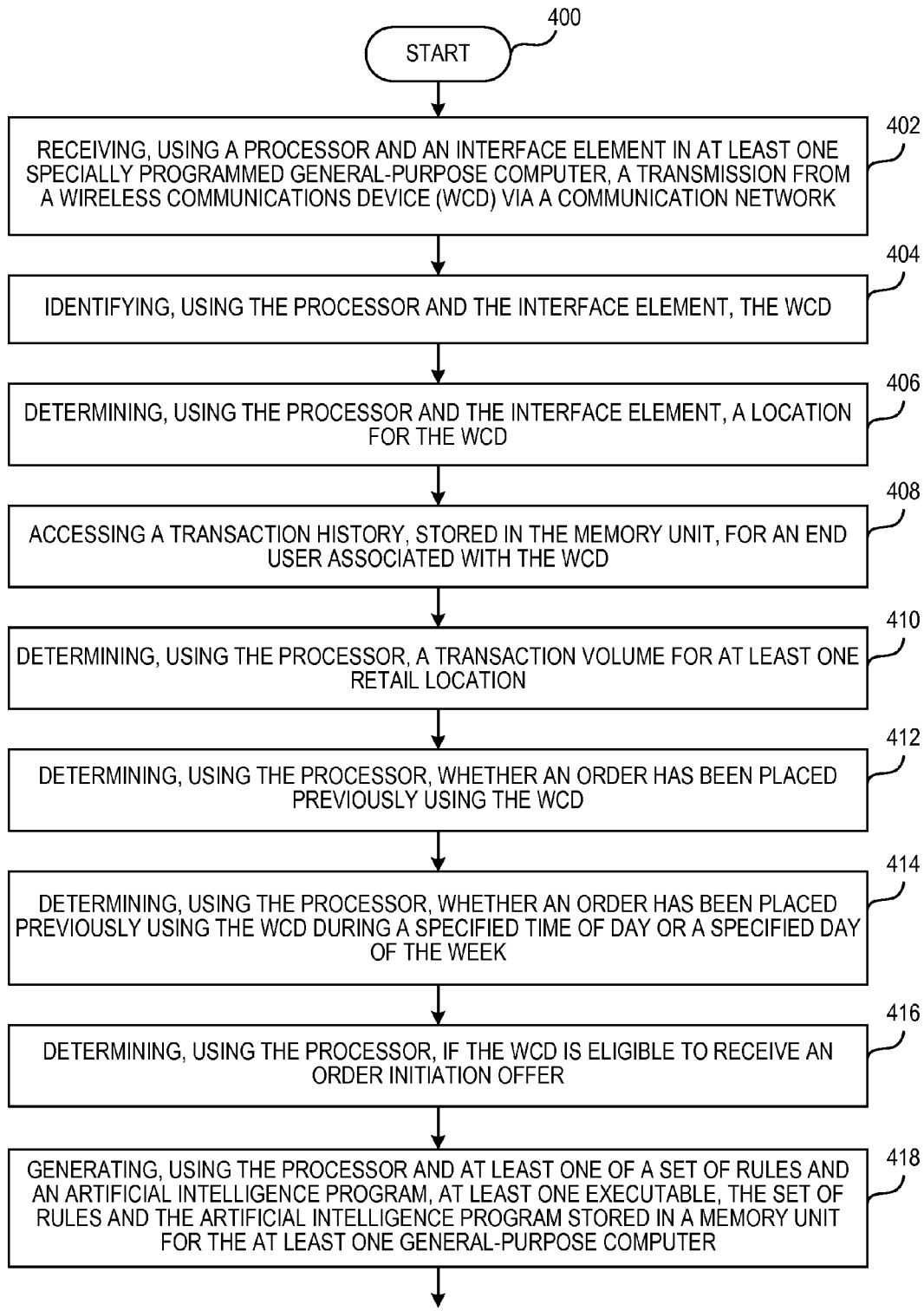
FIG. 4 is a flow chart of a present invention method for generating and transmitting an order initiation offer to a wireless communications device (WCD)
Figure 4:
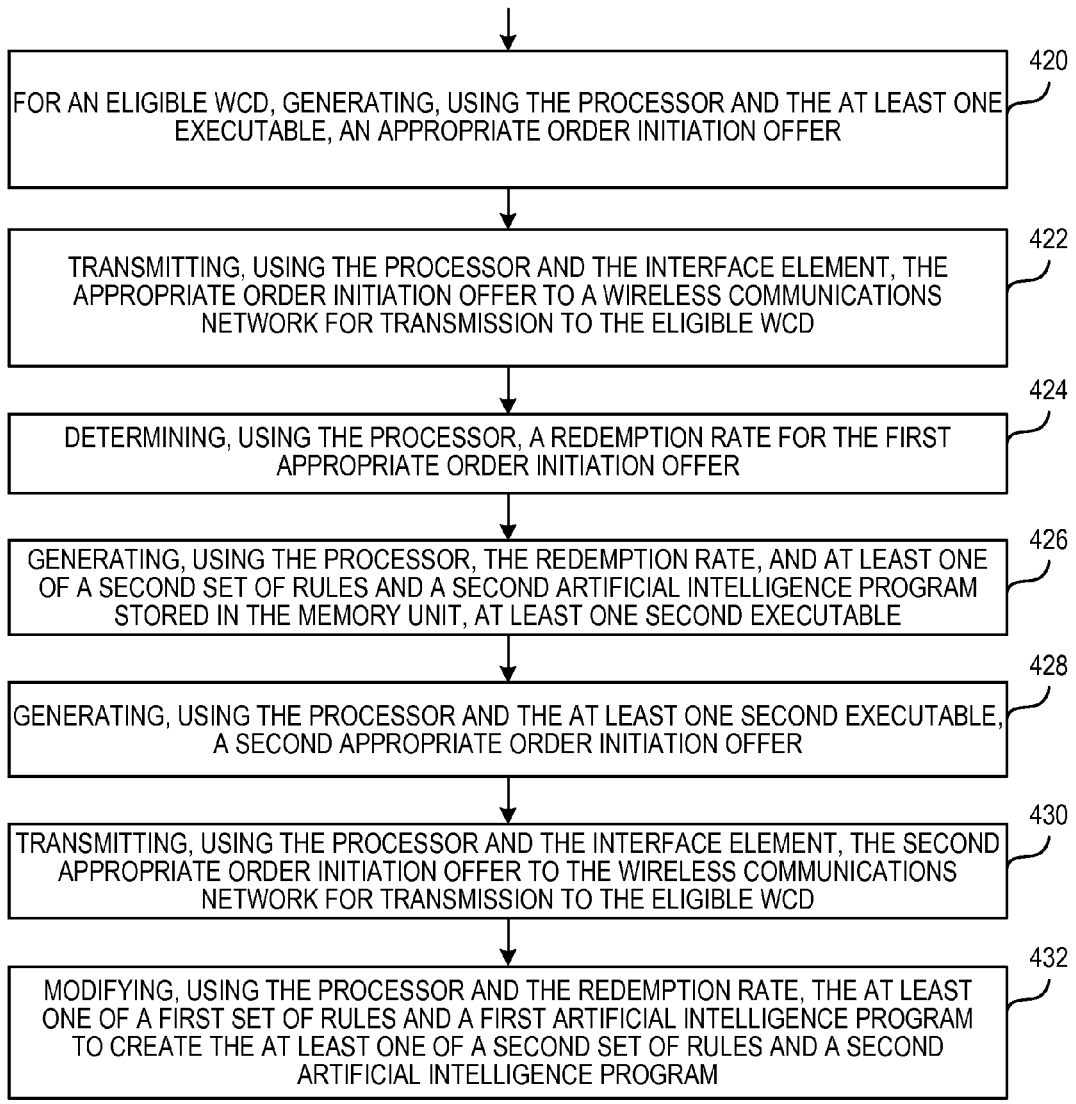

FIG. 4 is a flow chart illustrating a present invention computer-based method for generating and transmitting an order initiation offer to a wireless communications device (WCD). Although the method in FIG. 4 is depicted as a sequence of numbered steps for clarity, no order should be inferred from the numbering unless explicitly stated. The method starts at Step 400. Step 404 identifies, using a processor and an interface element in at least one specially programmed general-purpose computer, a WCD. Step 416 determines, using the processor, if the WCD is eligible to receive an order initiation offer. Step 418 generates, using the processor and at least one of a set of rules or an artificial intelligence program, at least one executable, the set of rules and the artificial intelligence program stored in a memory unit for the at least one general-purpose computer. Step 420, for an eligible WCD, generates, using the processor and the at least one executable, an appropriate order initiation offer. Step 422 transmits, using the processor and the interface element, the appropriate order initiation offer to a wireless communications network for transmission to the eligible WCD.

In a first embodiment, step 406 determines, using the processor and the interface element, a location for the WCD and determining if the WCD is eligible to receive an order initiation offer includes determining in response to the location, generating at least one executable includes generating the at least one executable responsive to the location, or generating an appropriate order initiation offer includes generating the appropriate order initiation offer responsive to the location.

In a second embodiment, step 408 accesses a transaction history, stored in the memory unit, for an end user associated with the WCD and determining if the WCD is eligible to receive an order initiation offer includes determining in response to the transaction history, and generating at least one executable includes generating the at least one executable responsive to the transaction history, or generating an appropriate order initiation offer includes generating the appropriate order initiation offer responsive to the transaction history. In one embodiment, the history includes searches made using the WCD or communications by the WCD. Alternately stated, the method links to search browsers associated with the WCD. Any type of search or WCD communication known in the art can be included in the history. For example, if the WCD has been used to search for products typically available at a retail location similar to the retail location, step 420 generates offers for transmission to the WCD when the WCD is within a specified location of such a retail location. As another example, the communications can be, but are not limited to, telephone calls or email messages to a specific retail location or to a category of retail locations. As another example, if the history shows that the WCD has communicated with the retail location, then steps 416 or 420 can be tailored in response to this information.

In a third embodiment, step 410 determines, using the processor, a transaction volume for at least one retail location and determining if the WCD is eligible to receive an order initiation offer includes determining in response to the transaction volume, and generating at least one executable includes generating the at least one executable responsive to the transaction volume, or generating an appropriate order initiation offer includes generating the appropriate order initiation offer responsive to the transaction volume.

In a fourth embodiment, step 412 determines, using the processor, whether an order has been placed previously using the WCD and determining if the WCD is eligible to receive an order initiation offer includes determining in response to whether an order has been placed previously using the WCD, and generating at least one executable includes generating the at least one executable responsive to whether an order has been placed previously using the WCD, or generating an appropriate order initiation offer includes generating the appropriate order initiation offer responsive to whether an order has been placed previously using the WCD.

In a fifth embodiment, step 414 determines, using the processor, whether an order has been placed previously using the WCD during a specified time of day or a specified day of the week and determining if the WCD is eligible to receive an order initiation offer includes determining in response to whether an order has been placed previously using the WCD during the specified time of day or the specified day of the week, and generating at least one executable includes generating the at least one executable responsive to whether an order has been placed previously using the WCD during the specified time of day or the specified day of the week, or generating an appropriate order initiation offer includes generating the appropriate order initiation offer responsive to whether an order has been placed previously using the WCD during the specified time of day or the specified day of the week.

In a sixth embodiment, step 416 obtains, using the processor, inventory information and determining if the WCD is eligible to receive an order initiation offer includes determining in response to the inventory information, and generating at least one executable includes generating the at least one executable responsive to the inventory information, or generating an appropriate order initiation offer includes generating the appropriate order initiation offer responsive to the inventory information.

In a seventh embodiment, step 424 determines, using the processor, a redemption rate for the first appropriate order initiation offer; step 426 generates, using the processor, the redemption rate, and at least one of a second set of rules and a second artificial intelligence program stored in the memory unit, at least one second executable; step 428 generates, using the processor and the at least one second executable, a second appropriate order initiation offer; and step 430 transmits, using the processor and the interface element, the second appropriate order initiation offer to the wireless communications network for transmission to the eligible WCD. In an eighth embodiment, step 432 modifies, using the processor and the redemption rate, the at least one of a first set of rules and a first artificial intelligence program to create the at least one of a second set of rules and a second artificial intelligence program.

In a ninth embodiment, determining, using the processor, if the WCD is eligible to receive an order initiation offer includes using at least one of the set of rules or the artificial intelligence program. In a tenth embodiment, determining if the WCD is eligible to receive an order initiation offer includes determining if an end user associated with the WCD is eligible for the order initiation offer. In an eleventh embodiment, determining if the WCD is eligible to receive an order initiation offer includes determining eligibility in response to the time of day, generating at least one executable includes generating the at least one executable responsive to the time of day, or generating an appropriate order initiation offer includes generating the appropriate order initiation offer responsive to the time of day. In a twelfth embodiment, determining if the WCD is eligible to receive an order initiation offer includes determining in response to a day of the week, generating at least one executable includes generating the at least one executable responsive to the day of the week, or generating an appropriate order initiation offer includes generating the appropriate order initiation offer responsive to the day of the week.

In a thirteenth embodiment, step 402 receives, using the processor and the interface element, a transmission from the WCD via the communication network and identifying a WCD includes identifying the WCD in response to the transmission.

Figure 5:
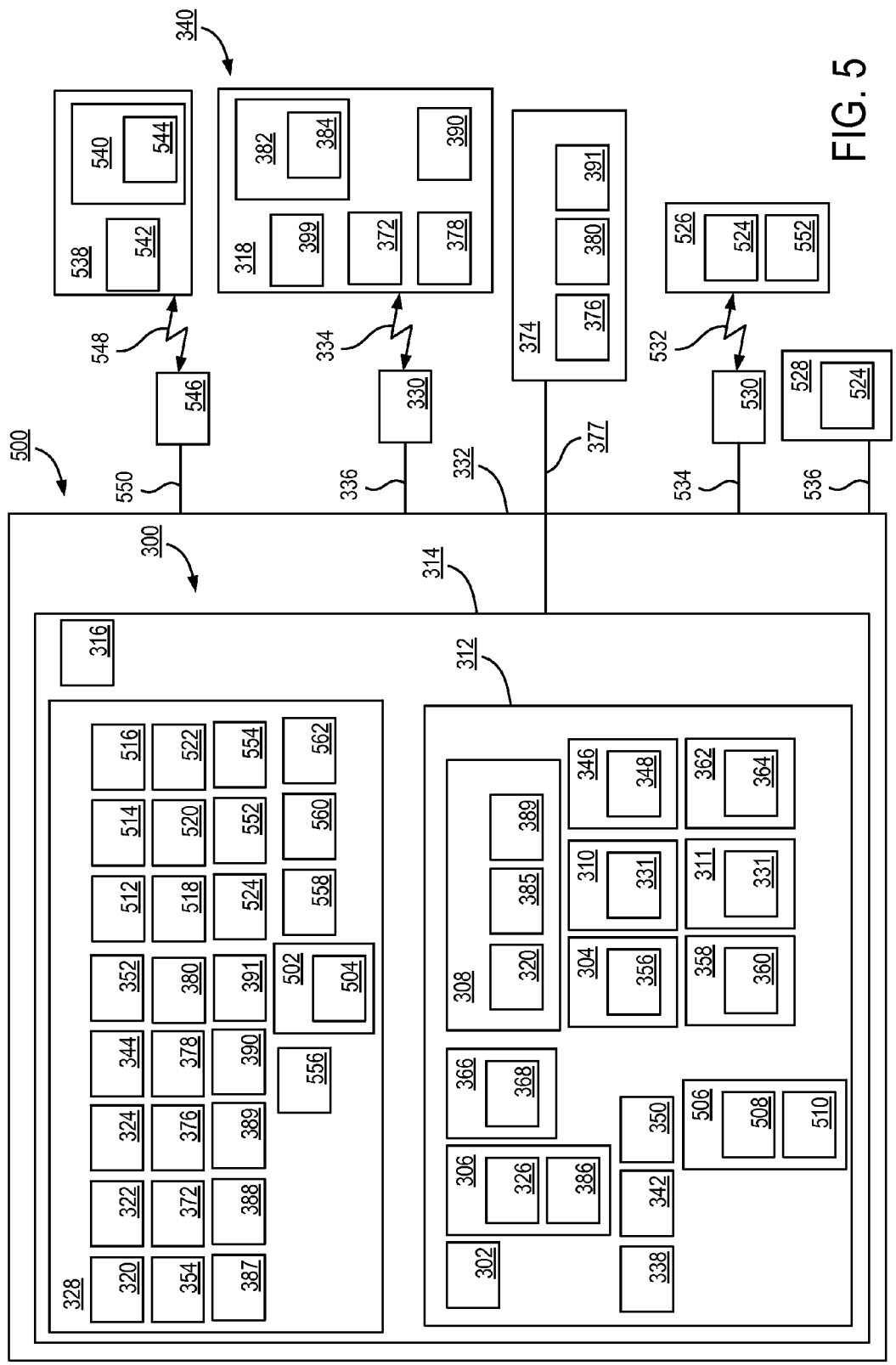
FIG. 5 is a block diagram for a present invention system for generating a real time offer or a deferred offer.

FIG. 5 is a block diagram for present invention system 500 for generating a real time offer or a deferred offer. The following should be viewed in light of FIGS. 3 through 5. System 500 is based on system 300 described in FIG. 3. Interface element 316 receives order 502 from an end user device (EUD). The EUD can be any EUD known in the art. In one embodiment, the EUD is WCD 318. In another embodiment (not shown), the EUD is one of a self-serve kiosk, a point of sale terminal, or a card authorization terminal. In the discussion that follows, the EUD is WCD 318; however, it should be understood that the discussion is applicable to any EUD known in the art.

The interface device stores the order in memory 328. In one embodiment, order 502 is the same as order 331. Order 502 includes at least one item or service 504 available from a business entity associated with location 332 (hereafter referred to as the first business entity). The following discussion is generally directed to an item 504; however, it should be understood that the discussion also is applicable to a service 504. System 500 also includes offer element 506, which generates offers 508 or 510 prior to completion, or fulfillment, of order 502 by the first business entity and transmits the offer(s) to the EUD. That is, offers 508 or 510 are transmitted to the EUD as part of the process of accepting and fulfilling order 502. For example, if location 332 is a restaurant, offers 508 or 510 are transmitted to the EUD before a food order is completed and made available to the customer placing order 502. In one embodiment, both offers are generated and transmitted. In another embodiment, only one or the other of the offers is generated and transmitted.

The offer element generates offer 508 using at least one of a set of rules 512 or artificial intelligence program 514 stored in memory unit 328. In general, the use of an AI program in system 500 includes the generation of one or more executables that are used to generate or modify an offer or constitute the offer. Offer 508 includes at least one item or service available from the first business entity and is fulfillable as part of the order. That is, the item or service included in offer 508 can be added to order 502. For example, if the first business entity is a restaurant and order 502 is for food items, a food item in offer 508 can be added to the food items in order 502 and the respective food items in order 502 and offer 508 can be presented together.

The offer element generates offer 510 using at least one of a set of rules 516 or artificial intelligence program 518 stored in memory unit 328. Offer 510 includes at least one item or service available from the first business entity and is fulfillable after fulfillment of the order by the first business entity. That is, the item or service included in offer 510 is not be added to order 502, but is fulfillable as a future order (not shown). In one embodiment, offer 510 is a printed or electronic coupon that is redeemable (depending on payment arrangements described infra) at a later date. For example, if the first business entity is a restaurant a food item in offer 510 is not added to order 502, but instead is in the form of a coupon for later redemption. In another embodiment, one or both of offers 508 and 510 include any incentive known in the art.

In a first embodiment, rules 512 and 516 are the same or artificial intelligence programs 514 and 518 are the same. In a second embodiment, offers 508 and 510 are the same. In a third embodiment, offers 508 and 510 include respective items or services that are the same. In a fourth embodiment, offers 508 and 510 include respective items or services that are different. In a fifth embodiment, offers 508 and 510 include respective incentives that are the same. In a sixth embodiment, offers 508 and 510 include respective incentives that are different.

In one embodiment, offer 510 is not made available to an end user of the EUD until payment is received for the offer. For example, information regarding the offer, such as items, services, or incentives in the offer, is transmitted to the EUD, along with the price for obtaining the offer, for example, receiving a redeemable coupon for the offer. Then, upon receipt of payment, using any means known in the art, for offer 510, the offer is validated for the EUD, for example, by transmitting a redeemable coupon, such as an electronic coupon, to the EUD.

In another embodiment, offer 510 is made available to an end user of the EUD before payment is received for the offer. For example, a non-redeemable coupon for items, services, or incentives included in the offer is transmitted to the EUD. Then, in order to redeem the coupon, payment must be provided, using any means known in the art, for offer 510. Any redemption/payment arrangement, such as printed or electronic coupons, known in the art can be used.

In a further embodiment, the offer element determines, using at least one of set of rules 520 or artificial intelligence program 522 stored in the memory unit, whether to transmit offer 510 before or after receipt of payment for the second offer. For example, the offer element determines whether to present offer 510 as a coupon that must be paid for in advance or as a coupon that can be paid for (and made redeemable) at a later date. In a still further embodiment, two or more of rules 512, 516, or 520 are the same or two or more of programs 514, 518, or 522 are the same.

In one embodiment, the offer element determines, using at least one of set of rules 556 or artificial intelligence program 558 stored in the memory unit, whether to generate and transmit both offers 508 and 510 or whether to generate and transmit only one of offers 508 or 510. In another embodiment, if only one of the offers is generated and transmitted, the offer element determines, using at least one of set of rules 560 or artificial intelligence program 562 stored in the memory unit, which of the offers to generate and transmit. In a further embodiment, two or more of rules 512, 516, 520, 556, or 560 are the same or two or more of programs 514, 518, 522, 558, or 562 are the same.

In one embodiment, the interface element is arranged to receive, at least one rule 524 from WCD 526, or from general-purpose computer 528 associated with a business entity and stores rule 524 in memory element 328. The business entity associated with computer 528 can be related to or the same as the business entity for location 332 or can be a separate business entity. In another embodiment (not shown), multiple computers 528 are included and respective computers among the multiple computers can be associated with the same or different business entities. Offer element 506 modifies offers 508 or 510 using rule 524 and transmits, using the interface element, modified offers 508 or 510 to the EUD. WCD 526 is connected to wireless communications network 530 with radio frequency connection 532. Network 530 is connected to computer 314 with hardwire connection 534. Connection 536 between computers 314 and 528 can be any type known in the art. The discussion, in the description of FIG. 3, of WCD 318 and network 330 is applicable to WCD 526 and network 530, respectively. The discussion, in the description of FIG. 3, of WCD 318 and rules 372 and 378 is applicable to WCD 526 and rule 524, respectively.

In one embodiment, WCD 538 includes memory element 540 and processor 542. WCD 538 stores at least one rule 544 in the memory element and processor 542 executes offer 508 or offer 510 according to rule 544. In another embodiment, processor 542 executes modified offer 508 or modified offer 510 according to rule 544. WCD 538 is connected to wireless communications network 546 with radio frequency connection 548. Network 546 is connected to computer 314 with hardwire connection 550. The discussion, in the description of FIG. 3, of WCD 318 and network 330 is applicable to WCD 538 and network 546, respectively. The discussion, in the description of FIG. 3, of WCD 318 and rule 384 is applicable to WCD 538 and rule 544, respectively.

In a further embodiment, if an acceptance of offer 508 or offer 510 is not received by the interface element from the EUD upon completion of order 502, one or both of offer 508 or offer 510 is retransmitted to the EUD. In yet another embodiment, the offer element determines a time frame for retransmission or whether to retransmit one or both of the offers using at least one of a set of rules 552 or artificial intelligence program 554 stored in memory unit 328. In yet a further embodiment, two or more of rules 512, 516, 520, 552, 556, or 560 are the same or two or more of programs 514, 518, 522, 554, 558, or 562 are the same.

It should be understood that system 500 can be operated by the same business entity operating or owning a business location using the system, or can be operated by a third party different than the business entity operating or owning the business location using the system. In one embodiment, a third party operates system 500 as disclosed by commonly-owned U.S. patent application Ser. No. 11/985,141: "UPSELL SYSTEM EMBEDDED IN A SYSTEM AND CONTROLLED BY A THIRD PARTY," inventors Otto et al., filed Nov. 13, 2007.

In yet another embodiment, third party offers can be made by system 500. For example, an incentive in offers 508 or 510 can be an item or service provided by a third party (for example, a party or entity different than the first business entity). If the offer is accepted, system 500 transmits billing and delivery information to the third party for fulfillment. In one embodiment, the third party pays a finder's fee, for example, to the first business entity and charges the fulfillment to a WCD.

It should be understood that system 500 can be integral with a computer operating system for a business location, for example, location 332 or with a business entity operating the business location. It also should be understood that system 500 can be wholly or partly separate from the computer operating system for a retail location, for example, location 332 or with a business entity operating the retail location.

It should be understood that the examples above regarding executables or other operations by artificial intelligence programs are non-limiting, are meant to provide only a broad overview, and do not address the number, complexity, structure, or interrelationships of the operations included in the actual generation of the executables or functioning of the artificial intelligence programs. It also should be understood that although individual rule sets and AI programs are discussed, the individual rule sets and AI programs can be combined into rules sets or AI programs including more than one of the individual rule sets or AI programs, respectively.

In a first embodiment, a present invention system or method presents and offer during transactions for items or services that can be added to a purchase total. In one embodiment, the offer, for example, offer 508 enables an end user to add an item or service to an order immediately. In another embodiment, the offer, for example, offer 510, enables the end user to accept a coupon for an item or service that can be redeemed at a later date. In a further embodiment, if the customer chooses to accept the item immediately, the item can added to the order, for example, order 502, the purchase total is adjusted, and, if appropriate, the item is incorporated into the fulfillment of order 502. In yet another embodiment, if the customer chooses to accept the coupon, the order total is adjusted and a coupon is printed.

In a first embodiment, the coupons that are printed are prepaid and can include total transaction information. When the coupons are redeemed, the coupons can instantly initiate a new transaction by adding the prepaid item or service to the order. In a second embodiment, the coupons that are printed are not prepaid and can include total transaction information. When the coupons are presented for redemption, the coupons can instantly initiate a new transaction starting with the item or service in the coupon. In a third embodiment, the offers interrupt the transaction for order 502 or are available as a sub menu that the end user can select to see available offers.

In one embodiment, the nature or specifics of offer 508 or offer 510 are not provided when the offer is transmitted to the EUD. That is, the offers are "mystery" offers. In another embodiment, the recipient of offer 508 or offer 510 is required to log on to a website (not shown) associated with system 500 and enter a code provided with offer 508 or offer 510 to see what items or services can be redeemed for offer 508 or offer 510.

A coupon associated with offer 508 or offer 510 can be paper or electronic. An electronic coupon can be transmitted to the EUD, using any means known in the art, including, but not limited to, transmitting or emailing to a WCD. In one embodiment, when the device is identified at the store again, the electronic coupon can instantly start the order with the specified item. In one embodiment, detection and use of a location for a EUD is as described in U.S. patent application Ser. No. 12/151,038, filed May 2, 2008 and entitled: "Method and Apparatus For Generating and Transmitting an Order Initiation Offer to a Wireless Communications Device." The coupon does not actually need to be transmitted to the device—the POS system can store the cell phone id and the next time the cell phone id is identified, it can retrieve the coupon that has been stored in the system.

Figure 6:
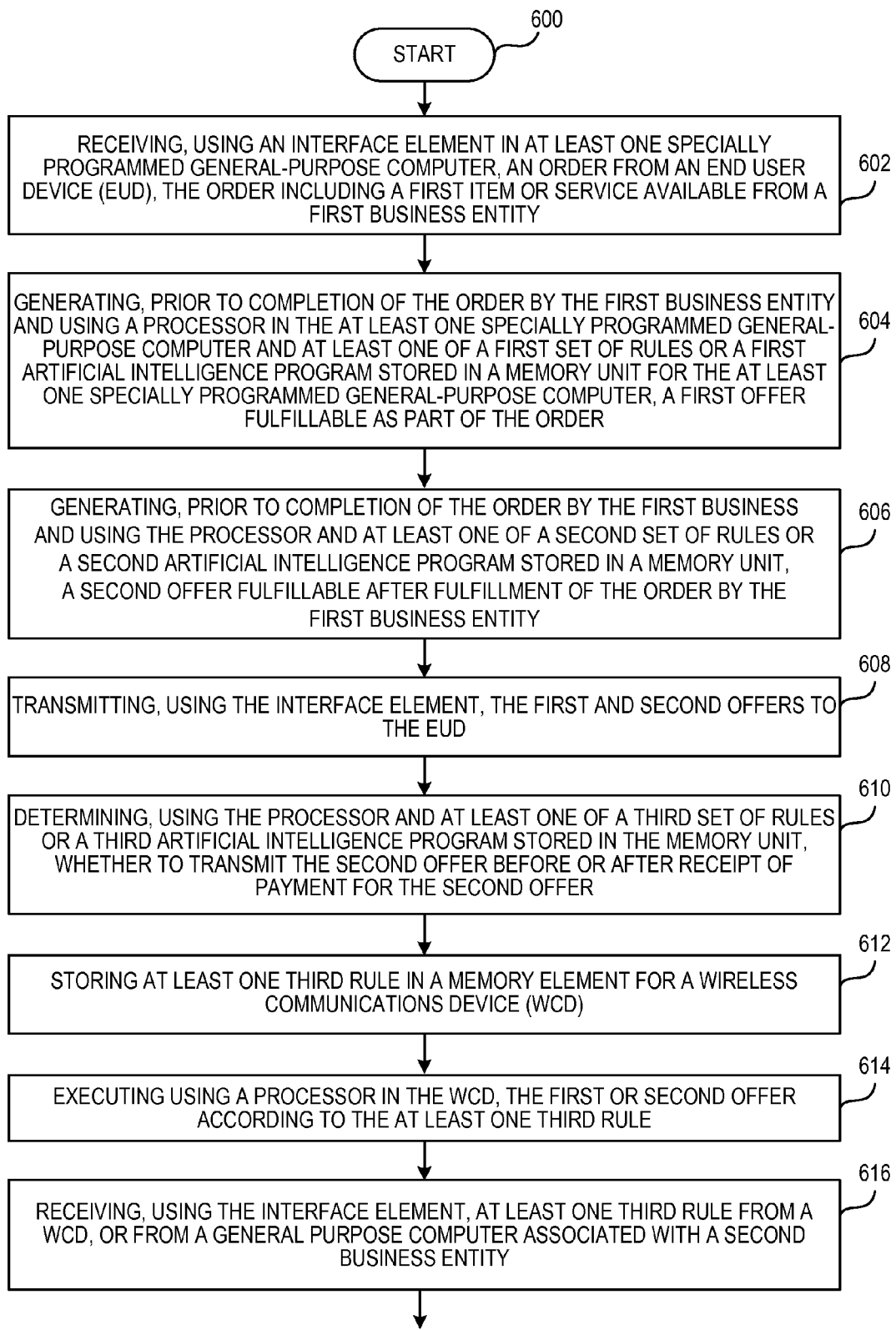
FIG. 6 is a flow chart illustrating a present invention computer-based method for generating a real time offer and/or a deferred offer; and, FIG. 7 is a flow chart illustrating a present invention computer-based method for generating a real time offer and/or a deferred offer.
Figure 6:
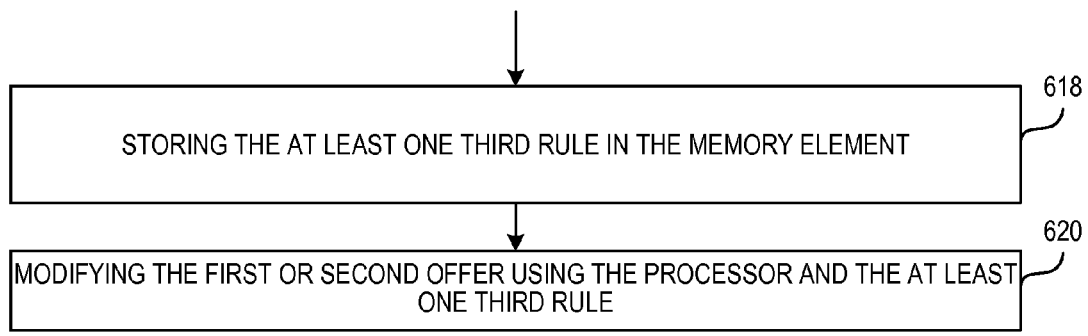

FIG. 6 is a flow chart illustrating a present invention computer-based method for generating a real time offer and/or a deferred offer. Although the method in FIG. 6 (and FIG. 7, infra) is depicted as a sequence of numbered steps for clarity, no order should be inferred from the numbering unless explicitly stated. The method starts at Step 600. Step 602 receives, using an interface element in at least one specially programmed general-purpose computer, an order from an end user device (EUD), the order including a first item or service available from a first business entity. Step 604 generates, prior to completion of the order by the first business entity and using a processor in the at least one specially programmed general-purpose computer and at least one of a first set of rules or a first artificial intelligence program stored in a memory unit for the at least one specially programmed general-purpose computer, a first offer fulfillable as part of the order. Step 606 generates, prior to completion of the order by the first business entity and using the processor and at least one of a second set of rules or a second artificial intelligence program stored in the memory unit, a second offer fulfillable after fulfillment of the order by the first business entity. Step 608 transmits, using the interface element, the first and second offers to the EUD.

In a first embodiment, the first and second sets of rules are the same or the first and second artificial intelligence programs are the same. In a second embodiment, the first and second offers are the same. In a third embodiment, the first and second offers include second and third items or services, respectively and the second and third items or services are the same or the second and third items or services are different. In a fourth embodiment, the first and second offers include first and second incentives, respectively and the first and second incentives are the same or the first and second incentives are different.

In one embodiment, step 610 determines, using the processor and at least one of a third set of rules or a third artificial intelligence program stored in the memory unit, whether to transmit the second offer before or after receipt of payment for the second offer. In another embodiment, step 612 stores at least one third rule in a memory element for the WCD and step 614 executes, using a processor in the WCD, the first or second offer according to the at least one third rule. In a further embodiment, step 616 receives, using the interface element, at least one third rule from a WCD, or from a general-purpose computer associated with a second business entity; step 618 stores the at least one third rule in the memory element; and step 620 modifies the first or second offer using the processor and the at least one third rule. In yet another embodiment, the first and second business entities are the same.

Figure 7:
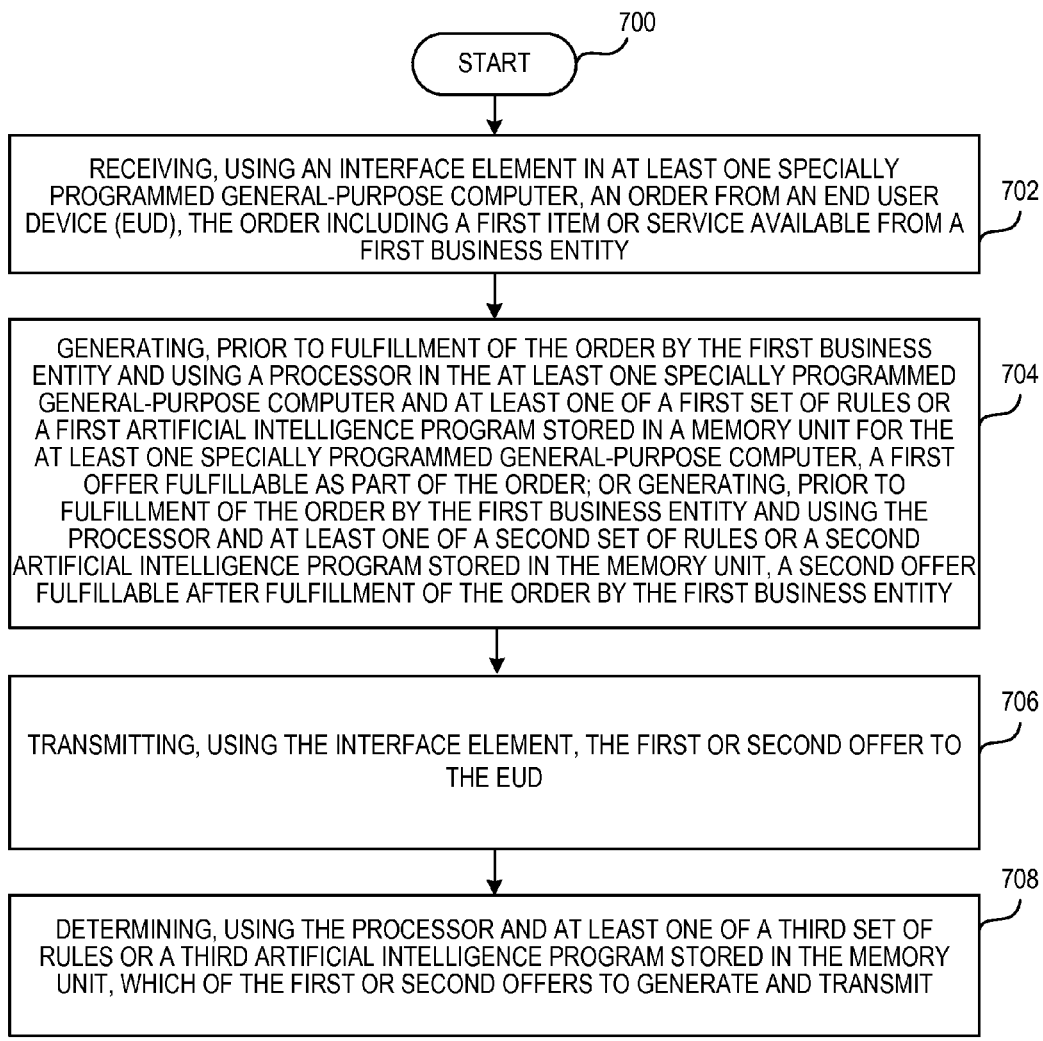

FIG. 7 is a flow chart illustrating a present invention computer-based method for generating a real time offer or a deferred offer. The method starts at step 700. Step 702 receives, using an interface element in at least one specially programmed general-purpose computer, an order from an end user device (EUD), the order including a first item or service available from a first business entity. Step 704 generates, prior to fulfillment of the order by the first business entity and using a processor in the at least one specially programmed general-purpose computer and at least one of a first set of rules or a first artificial intelligence program stored in a memory unit for the at least one specially programmed general-purpose computer, a first offer fulfillable as part of the order; or generates, prior to fulfillment of the order by the first business entity and using the processor and at least one of a second set of rules or a second artificial intelligence program stored in the memory unit, a second offer fulfillable after fulfillment of the order by the first business entity. Step 706 transmits, using the interface element, the first or second offer to the EUD. In one embodiment, step 708 determines, using the processor and at least one of a third set of rules or a third artificial intelligence program stored in the memory unit, whether to generate and transmit the first offer or the second offer. In another embodiment, one or more of the first, second, or third sets of rules are the same or one or more of the first, second, or third artificial intelligence programs are the same.

The following should be viewed in light of FIGS. 3 through 7. The following is a non-limiting example of a present invention system or method. A fast serve restaurant is used to illustrate operation of a present invention system or method; however, it should be understood that a present invention system or method is not limited to use with a fast serve restaurant and that operation of a present invention system or method with any business entity providing an item or service to a customer is included within the spirit and scope of the claimed invention. The customer is an end user of WCD 318. Order 502 is placed by WCD 318 and restaurant 332 places the order in the appropriate queue. When the order is ready for the customer, for example, the item or items in the order are cooked or assembled, offers 508 and 510 are generated by the offer element and sent to WCD 318 along with a notice to the EUD that the order is complete. The discussion, in the description of FIG. 3, regarding the generation of offer 320 by offer element 308 is applicable to the generation of offers 508 and 510 by offer element 506. For example, rules, artificial intelligence, a history of an end user for WCD 318, or parameters associated with operation of the restaurant can be used to generate the offer.

If offer 508 is accepted, item(s) included in the offer and selected from the offer are added to order 502, and, if appropriate, added to the queue for preparation or assembly. When order 502 is ready, a message is sent to WCD 318. Order 502 can be paid for by any means known in the art, for example, billed to an electronic payment system associated with WCD 318, or can be paid using conventional methods in the restaurant. The end user is prompted to enter a payment type and the transaction is flagged as "paid with device" or "requires payment" at the POS unit (not shown) of the restaurant handling order 502.

If offer 510 is accepted, a coupon for items included in the offer and selected from the offer is generated and transmitted to or otherwise made available to an end user of the WCD. The coupon can be prepaid, for example, as part of the payment of order 502 or can be paid for at the time of redemption. The coupon can be paid for by any means known in the art, for example, billed to an electronic payment system associated with WCD 318, or can be paid using conventional methods in the restaurant. The end user is prompted to enter a payment type and the transaction is flagged as "paid with device" or "requires payment" at the POS unit (not shown) of the restaurant handling order 502.

In system 500, computer 314 is configured to generate and transmit an offer, for example offer 508 or offer 510, in response to an order using rules or AI programs. In one embodiment, a present invention system, for example, system 500, adds additional layers of distributed control and input or distributed control of the implementation of executables from the central system (computer 314). For example, computer 314 generates and optimizes offers, for example offer 508 or offer 510, in response to an order. However, this operation is further constrained by rules, for example, rule 524, provided an outside computer or WCD, for example, computer 528 or WCD 526. The rules specified by a business entity associated with the outside computer, for example, computer 528, or specified by the WCD, for example, WCD 526, can be self generated or end user implemented. Rules or filters can all be stored at the central system, or can be distributed across the various pieces of hardware in system 500.

In another embodiment, computer 314 tracks search, purchase, and travel behavior of a WCD, such as WCD 318. In a further embodiment, retailers may import or otherwise access transaction history of WCD end users that are mapped to a specific WCD or group of WCDs.

Computer 314 can use data collected from a WCD as well as the data provided by one or more business entities about the WCD to generate offers to the WCD. System 500 also can serve as a point of sales system for the business entity associated with location 332, for example, enabling the entity to store transaction information about WCDs making purchases with the entity. Computer 314 can use the transaction history data to refine offers made to WCDs. In still another embodiment, computer 314 operates as a phone service provider and web search engine for the WCDs, enabling the computer to store a call log of the WCDs which can be used to refine offers made to WCDs.

In one embodiment, if offer 508 or 510 is rejected, or otherwise not acted upon, an additional offer can be made and transmitted or the original offer can be modified and re-transmitted as disclosed by commonly-owned U.S. patent application Ser. No. 12/217,863, titled: "SYSTEM AND METHOD FOR PROVIDING INCENTIVES TO AN END USER FOR REFERRING ANOTHER END USER" inventors Otto et al., filed Jul. 9, 2008.

The present invention can use tables, rules, genetic algorithms or any combination of the forgoing.

The following is a non-limiting example of a possible sequence for a present invention method or system. A first general aspect is generating an offer: receive customer ID (optional); receive order; generate offer; if offer accepted, was offer for real time; if offer was for real time, add offer item(s) to purchase total and add item to order for assembly and fulfillment; if offer was not for real time, generate and output coupon; add coupon purchase to order total; receive payment; and process transaction. A second general aspect is with respect to a storing an electronic coupon: receive acceptance of coupon offer; receive end user ID; and store coupon offer with end user ID.

The following is a non-limiting example of a possible sequence for a present invention method or system.
1. Customer accepts a "later offer"
2. Printing coupon with:
   a. Accepted offer item
   b. Bar Code Number with a GUID—Globally Unique ID—single use number that is linked to a database that contains the: Date and time, transaction and store number, item number, third party or vendor item number, menu item price, sales (discounted) price, sales tax (estimate), store zip code, state code.
   c. Store name and address (in customer readable format)
   d. Expiration date (if any), which should be user definable
3. Using the "integrated" method, coupons may be treated as "deferred sales." Therefore, when the customer accepts a coupon offer item, the system might return a "voucher" that is good for the future delivery of a specific menu item. The voucher, which displays the menu item selected and the total amount of the discount off of menu item price.
4. Customer returns to store or location with the voucher (or coupon) to redeem it
5. Cashier scans the voucher or coupon
6. The system attempts to validate the voucher/coupon number by:
   a. If the system is attached to the Internet, it will look up the number on the remote database (whether located at the retail operator's or some other facilities, e.g., a co-lo or at the franchisee's data center), or b. If the Internet is down or if the location operator, e.g., a franchisee has decided upon local validation only, the system could check the number on its local database only or using a validation algorithm, e.g., check sum or other method(s). This database is created even if the Internet option is selected so that there is always a local file. If the Internet option were implemented, the system would also distribute other store's negative file to stores within its local geographic territory (e.g., using zip or state codes (depending upon estimated file sizes) so that in an off-line setting, customers could still redeem coupons at store locations other than the store where the voucher was originally purchased). This option may require an added level of programming sophistication, i.e., when the Internet is back online, the system could synchronize the various stores' databases, bringing all locations up to date.

7. If the voucher number is found, the system could flag the voucher as "redeemed" in the file, along with the date, time, store number, total check amount, other items ordered, cashier id or name, etc.

8. If the voucher is valid, the offer item may be automatically added to the order via an enhanced POS or other interface. The improved interface would enable the start of an order and add an item or items to the order, which could then be processed by the POS system for production, accounting, tax and other purposes. Once the item is added to the order, the remaining order processing occurs as usual or the cashier can simply press the "total" key or, as in a kiosk example, the customer could proceed to the "checkout" button. In the case where a voucher or coupon is prepaid, and if the customer is only redeeming the voucher and orders nothing else, there could be a zero total due, unless the customer is redeeming the voucher in a different store with higher or lower taxes or differing prices, which differences may or may not be considered when computing any amounts due or owing.

9. Accounting: Coupons, e.g., vouchers, may be accounted for using any applicable means available, including, for example, treating these offers as deferred sales, in which cases, a voucher may be recorded as a liability. When the voucher is purchased, cash may be debited (for the full amount including taxes) and deferred sales would be credited (for the full amount less taxes) and tax liability credited for an amount equal to the value of the taxes. When the voucher is redeemed, the menu item is added to the order, deferred sales would be debited and sales would be credited. Taxes were already collected and accounted for in a previous transaction. To address these issues, the accounting systems, including the POS, for example, could be modified to handle the vouchers in this fashion: When the voucher is purchased, the full amount could be credited to a deferred sales/liability account.

10. If the coupon has a valid GUID, but it has already been redeemed, then the suggestive selling or marketing system could display a new message (to the customer) for example: "Sorry this coupon has already been redeemed, please see the manager" (if the coupon file indicates it has already been redeemed, or it could say: "Sorry this is not a valid coupon." if the GUID cannot be found.

In one embodiment, new reports and modified reports are used be included to track and report on:

1. Coupon accept rates, average deal value, discount amounts, discount averages, Gross Margin, Offer Frequency, etc.
2. Coupon redemption rates, average days to redemption, average check and average item counts with and without coupons. Gross margin, average check, average item counts for orders with and without accepts or coupons.
3. Estimated or calculated "breakage" i.e., after a user specified "assumed perished date" or "expiration date"—e.g., 90 days from issuance. Breakage is defined as coupons that are issued but are never redeemed.
4. Fraud measurement—i.e., frequency of failed validation attempts (indicating attempts to revalidate a previously redeemed coupon or possible photocopied or forged coupons. Such fraud may include attempts at gaming or fishing the system.

In another embodiment, in addition or in the alternate, a non-integrated system for coupon validation may be provided, which system might include the following key design points, including, for example, without the requirement of any (or limited) changes to the existing POS interface, or any further efforts by the POS software company: allow customers to easily purchase and redeem coupons, while ensuring that coupons are not falsified; permit flexibility in the coupon validation system, i.e., permit in store, multiple store, and chain-wide validation options; and provide for proper accounting of the entire transaction, from coupon issuance and redemption to inventory control.

The following discussion provides further detail regarding a present invention system or method. One goal of the present invention is to convert otherwise disinterested customers into interested customers. For example, customers (end users of the EUD) receive an offer, for example, offer 508, for immediate purchase and acquisition of an item or service, and customers receive an offer, for example, offer 510, to purchase the item, good or service now or at some future date. In the event a customer accepts an offer for a future use or purchase, such customer may receive a coupon good for such item, good or service. For example, in a quick service restaurant (QSR), location, a customer may place an order for a Big Mac, Large Fry and Large Coke, offer 508 could include a dessert item. In addition, offer 510 could include an offer to buy a dessert for later consumption, e.g., next week. A customer can accept such an offer for later consumption via any applicable means, including, for example, by accepting a coupon, which coupon may or may not restrict use of such coupon until a designated later date. In one embodiment, such a coupon may be valid for use immediately or at some other prescribed future date. In another embodiment, the coupon includes a discount. Such discount, if any, may be for more or less or the same discount as offered with offer 508.

In a first embodiment, coupons are valid for specified time periods or time intervals, for example, for certain days, dates, days of the week, months, hours of the day, or any combination of these. In a second embodiment, the coupons include other limiting language or terms, e.g., such a coupon may or may not have an expiration date, or the discount may expire, all at once or over a given period of time. In a third embodiment, the coupons include a bar code or other identification means so that the coupon may be verified as being valid, accurate, not expired, not previously used or redeemed or any other terms and conditions, such as time of day, day of week or other possible restrictions or permissions.

In one embodiment, coupon offers may be for the same or similar item(s) as in offer 508. For example, if a customer orders a Combo Meal Number One and offer 508 includes a dessert item, e.g., an apple pie for $0.50 off, offer 510 could be for the apple pie with the same discount or may offer a coupon for a milkshake for $0.50 or, e.g., $0.70 off. By making such offers for later consumption, Applicants have determined that a greater percentage of customers accept such offers. When presented with a choice of offers 508 and 510 ("now" or "later" offers), the probability that an end user of the EUD may accept one or the other offer increases substantially. This is particularly true for those offers that include a discount component or for those end users that are not very hungry at the time, but think it is likely they will return at some future date. In another embodiment, when an end user accepts offer 510, a present invention system or method requires immediate payment to receive a coupon. When a customer pays for a coupon, they are generally more likely to return or redeem such coupon than if they receive the coupon without payment.

In one embodiment, an end user can choose to accept offer 510 and receive a coupon valid for a subsequent date or purchase, but pay for such coupon at a later time, either when it is convenient or when making such subsequent purchase. In this case, the decision to accept the coupon is easier as little or no cost to the customer is involved. This may increase the likelihood that the customer will accept the coupon.

In one embodiment, a present invention system or method makes use of both types of coupon offers, i.e., paid and promise to pay coupons. In such cases, a present invention system or method could be configured using a table based or rules based system to determine when or if and which type of such offers to make and their payment types. In addition or in the alternate, the system could include a neural net or genetic algorithm to permit the system to optimize the results of such various coupon offer types.

In one embodiment, once offer 508 has been determined, offer 510 for the same or similar item may be presented or another unique item or items may be presented, which items may or may not have anything to do with items or services in offer 508 or other offers 510. Such offers 510 may also be determined without regard to items or services in offer 508 or may use a separate method to determine the best or optimal item(s) to offer.

In another embodiment, information or knowledge about a customer or group of customers or class of customers may be used in making offer 508 or offer 510. For example, a present invention system or method can obtain data regarding an end user's purchasing history and can generate offer 508 or offer 510 accordingly. For example, offer 508 or offer 510 can include a discount on items that an end user never or rarely orders, or only for items the end user rarely or never orders given what is included in order 502. In a further embodiment, a present invention system or method accesses information from existing systems, including, for example, existing POS databases. The information can include customer transaction data, price lists, inventory information or other in or above store, e.g., location data, including, but not limited to data in a POS, back office system, inventory system, revenue management system, loyalty or marketing program databases, labor management or scheduling systems, time clock data, production or other management systems, e.g., kitchen production or manufacturing systems, advertising creation or tracking databases, including click through data, impressions information, results data, corporate or store or location financial information, including, for example, profit and loss information, inventory data, performance metrics, e.g., speed of service data, customer survey information, digital signage information or data, or any other available information or data, or system settings data.

In yet another embodiment, a present invention system or method accesses and uses information known about a customer, a customer's buying habits, current order contents, payment method, destination, e.g., drive through vs. front counter orders vs. pick up orders vs. delivery, etc., total check amount, missing category of items, prior offer acceptance/rejection information, gaming or fishing information, in general or specifically known about a given customer or class of customers, or any other available information. When using such information, a present invention system or method, using rules, or a neural net or genetic algorithm, can better generate offer 508 or offer 510 and determine items, service, or incentives to include or whether or not to include a coupon offer for now or later use or if such coupon should or should not include a discount or other promotional content.

In a still further embodiment, the preceding information can be used to determine or affect, in whole or in part, the marketing message that is presented to such a customer in offer 508 or offer 510. For example, after trying various offers, a present invention system or method may determine that a given customer, or group or class of customers are more likely to accept a discounted coupon when the discount percentage is displayed or presented. Then, a present invention system or method can include such discount percentage amount more often or always, or so long as accept rates by such customer or class of customers remains constant or improves. In another example, a present invention system or method may determine that certain customers are better influenced if the dollar amount of the savings is display, e.g., instead of 50% off, the system might indicate a savings of $0.75. In this fashion, such a learning system could improve the results of the present invention by modifying the type and frequency of offers, and the discount applied, if any, and the method of conveying the offer, including, for example, the amount or type of discount.

In yet a further embodiment, offer 508 or offer 510 can be modified or tested using a present invention system or method, which could improve results over time. For example, the system could be set up with a variety of offer rules, discounts, or offer types, the system could further test such rules, discounts and offers to determine which are most effective and yield maximum sales or profits under any of several conditions.

In one embodiment, coupons are inscribed with one or more identification codes, for example a bar code. Such bar code may include any one or more of the following information or may be a record locator or other serial number or ID number to permit retrieval or verification or use of any one or more of: a) coupon type, e.g., discount, paid or free coupon, b) amount of coupon, c) discount type or amount, d) customer number or other identification, e) location issued number, f) date issued, g) expiration date, h) valid days, dates, hours, etc., i) issued on, j) issued by, or k) any other restrictions or terms, e.g., buy one get one free, or buy one get one half off, or buy a combo meal, get a free French fry, etc., or any combination of the foregoing. Such code, e.g., bar code, may only be a number used to look up any or all of the preceding information or to retrieve any other information available.

Methods to create and affix a bar code to an item are well known in the prior art and any applicable means may be used to create or access such bar code or other coded information. For example, such bar codes could be generated using a stand alone system or an integrated system. An integrated system could include several key design points or objectives including, for example: an option that allows customers to easily purchase and redeem POS terminal or other system's generated coupons, while ensuring that coupons are not falsified. Flexibility in the coupon validation system, i.e., permit in store or location, multiple store or locations, and chain-wide validation options. The system can provide for proper accounting of the entire transaction, from coupon issuance and redemption to inventory control. The system can maximize accounting controls, ensure proper coupon validation (which is a potential shortcoming of any standalone design), speed of service and ease of use.

In another embodiment, end users can identify themselves using overt actions, e.g., by swiping a card, in other embodiments, in addition or in the alternative to providing such identification means overtly, such end users may identify themselves passively.

In accordance with some embodiments, an integrated system may include, for example, the following capabilities or components:
1. Modify a current POS interface as little as possible with the goal of shifting as much work away from the POS software company and on to a third party provider.
2. Coupon Printing System
3. Coupon Validation Method
4. Anti-fraud Features
5. Local or above store validation system (option)
6. Marketing system or coupon system controlled databases
7. New reports to provide issuance and redemption analysis
8. Accounting controls and options The following is a listing of exemplary systems and methods in accordance with various embodiments described in this disclosure:

A-1. A method for generating a real time offer or a deferred offer, comprising the steps of: receiving, using an interface element in at least one specially programmed general-purpose computer, an order from an end user device (EUD), the order including a first item or service available from a first business entity; generating, prior to fulfillment of the order by the first business entity and using a processor in the at least one specially programmed general-purpose computer and at least one of a first set of rules or a first artificial intelligence program stored in a memory unit for the at least one specially programmed general-purpose computer, a first offer fulfillable as part of the order; generating, prior to fulfillment of the order by the first business entity and using the processor and at least one of a second set of rules or a second artificial intelligence program stored in the memory unit, a second offer fulfillable after fulfillment of the order by the first business entity; and, transmitting, using the interface element, the first and second offers to the EUD.

A-2. The method of A-1 wherein the first and second sets of rules are the same or the first and second artificial intelligence programs are the same.

A-3. The method of A-1 wherein the first and second offers are the same.

A-4. The method of A-1 wherein the first and second offers include second and third items or services, respectively and wherein the second and third items or services are the same or wherein the second and third items or services are different.

A-5. The method of A-1 wherein the first and second offers include first and second incentives, respectively and wherein the first and second incentives are the same or wherein the first and second incentives are different.

A-6. The method of A-1 further comprising the step of determining, using the processor and at least one of a third set of rules or a third artificial intelligence program stored in the memory unit, whether to transmit the second offer before or after receipt of payment for the second offer.

A-7. The method of A-1 wherein the EUD is a wireless communications device (WCD) and the method further comprising the steps of: storing at least one third rule in a memory element for the WCD; and, executing, using a processor in the WCD, the first or second offer according to the at least one third rule.

A-8. The method of A-1 further comprising the steps of: receiving, using the interface element, at least one third rule from a WCD, or from a general-purpose computer associated with a second business entity; storing the at least one third rule in the memory element; and, modifying the first or second offer using the processor and the at least one third rule.

A-9. The method of A-8 wherein the first and second business entities are the same.

A-10. A system for generating a real time offer or a deferred offer, comprising: an interface element, for at least one specially programmed general-purpose computer, arranged to receive an order from an end user device (EUD), the order including a first item or service available from a first business entity; and, an offer element, in a processor for the at least one specially programmed general-purpose computer, arranged to: generate, prior to fulfillment of the order by the first business entity and using at least one of a first set of rules or a first artificial intelligence program stored in a memory unit for the at least one specially programmed general-purpose computer, a first offer fulfillable as part of the order; and, generate, prior to fulfillment of the order by the first business entity and using the processor and at least one of a second set of rules or a second artificial intelligence program stored in the memory unit, a second offer fulfillable after fulfillment of the order by the first business entity; and, transmit, using the interface element, the first and second offers to the EUD.

A-11. The system of A-10 wherein the first and second sets of rules are the same or the first and second artificial intelligence programs are the same.

A-12. The system of A-10 wherein the first and second offers are the same.

A-13. The system of A-10 wherein the first and second offers include second and third items or services, respectively and wherein the second and third items or services are the same or wherein the second and third items or services are different.

A-14. The system of A-10 wherein the first and second offers include first and second incentives, respectively and wherein the first and second incentives are the same or wherein the first and second incentives are different.

A-15. The system of A-10 wherein the offer element is arranged to determine, using at least one of a third set of rules or a third artificial intelligence program stored in the memory unit, whether to transmit the second offer before or after receipt of payment for the second offer.

A-16. The system of A-10 wherein the EUD is a wireless communications device (WCD) storing at least one third rule in a memory element for the WCD and arranged to execute, using a processor in the WCD, the first or second offer according to the at least one third rule.

A-17. The system of A-10 wherein the interface element is arranged to receive at least one third rule from a WCD, or from a general-purpose computer associated with a second business entity and wherein the offer element is arranged to: store the at least one third rule in the memory element; and, modify the first or second offer using the processor and the at least one third rule.

A-18. The system of A-17 wherein the first and second business entities are the same.

A-19. A method for generating a real time offer or a deferred offer, comprising the steps of: receiving, using an interface element in at least one specially programmed general-purpose computer, an order from an end user device (EUD), the order including a first item or service available from a first business entity; generating, prior to fulfillment of the order by the first business entity and using a processor in the at least one specially programmed general-purpose computer and at least one of a first set of rules or a first artificial intelligence program stored in a memory unit for the at least one specially programmed general-purpose computer, a first offer fulfillable as part of the order; or, generating, prior to fulfillment of the order by the first business entity and using the processor and at least one of a second set of rules or a second artificial intelligence program stored in the memory unit, a second offer fulfillable after fulfillment of the order by the first business entity; and, transmitting, using the interface element, the first or second offer to the EUD.

A-20. The method of A-19 further comprising the step of determining, using the processor and at least one of a third set of rules or a third artificial intelligence program stored in the memory unit, which of the first or second offers to generate and transmit.

A-21. The method of A-20 wherein one or more of the first, second, or third sets of rules are the same or wherein one or more of the first, second, or third artificial intelligence programs are the same.

A-22. A system for generating a real time offer or a deferred offer, comprising: an interface element, for at least one specially programmed general-purpose computer, arranged to receive an order from an end user device (EUD), the order including a first item or service available from a first business entity; and, an offer element, in a processor for the at least one specially programmed general-purpose computer, arranged to: generate, prior to fulfillment of the order by the first business entity and using at least one of a first set of rules or a first artificial intelligence program stored in a memory unit for the at least one specially programmed general-purpose computer, a first offer fulfillable as part of the order; or, generate, prior to fulfillment of the order by the first business entity and using the processor and at least one of a second set of rules or a second artificial intelligence program stored in the memory unit, a second offer fulfillable after fulfillment of the order by the first business entity; and, transmit, using the interface element, the first or second offer to the EUD.

A-23. The system of A-22 wherein the offer element is arranged to determine, using at least one of a third set of rules or a third artificial intelligence program stored in the memory unit, which of the first or second offers to generate and transmit.

A-24. The system of A-23 wherein one or more of the first, second, or third sets of rules are the same or wherein one or more of the first, second, or third artificial intelligence programs are the same.

The following is a listing of exemplary hardware and software that may be used in a present invention method or system. It should be understood that a present invention method or system is not limited to any or all of the hardware or software shown, that not all of the exemplary hardware and/or software may be necessary or desirable for particular embodiments, and that other hardware and software are included in the spirit and scope of the claimed invention.

1. Hardware:
   a. Central System, Central Controller or Local Controllers. The present invention can be managed by a central system on behalf of multiple business entities or locations or systems associated with portions of the multiple business entities or locations can implement the present invention.
   b. Retailer System/Device 1-n: may be used, in accordance with some embodiments, for tracking the acceptance of order initiation offers and/or the transactions processed when offers are accepted.
   c. End User Device 1-n: may be used, in accordance with some embodiments, for receiving order initiation offers.
   d. Store Server (for example, location 332 and computer 314)
2. Software:
   a. Desired Transaction Program: generates desired transactions; modifies desired transactions, for example, based on performance metrics; generates and modifies presentations for desired transactions; and manages desired transactions.
   b. Incentive Program: generates incentives; modifies incentives, for example, based on performance metrics; generates and modifies presentations for incentives; and manages incentives.
   c. Reward Program: manages available and active programs regarding generation, allocation, and dissemination of rewards.
   d. Reward Alteration Program: alters reward programs based on performance data.
   e. Offer Initiation Program: creates offers and outputs them to appropriate parties based on rules and conditions.
   f. Offer Rules and Condition Creation Program: creates rules and conditions under which offers can be made.
   g. Time/Traffic Map Generation Program: creates time/traffic maps of stores that can be used to help generate specific offers during specific traffic times.
   h. Suggestive Selling/Offer Generation Program The following is a listing of exemplary data bases that can be used in a present invention method or system. It should be understood that a present invention method or system is not limited to any or all of the databases shown, that not all of the exemplary hardware and/or software may be necessary or desirable for particular embodiments, and that other databases are included in the spirit and scope of the claimed invention.

Account Database-stores master account information.

Sub-account Database-stores sub account information.

Transaction Database-stores transaction data including reward program data and transaction histories, for example, history 110.

Rewards Database-stores available rewards programs.

Rewards Rules Database-stores rules for rewards programs.

Reward Incentive Database-stores incentives for rewards programs.

Reward Incentive Rules Database-stores rules for making rewards program incentives.

Active Reward Programs Database-stores active rewards programs.

Account and Sub-account Score/Class Database-stores scoring data for accounts and sub accounts.

Available Penalty Database-stores penalties that can be associated with reward programs.

Available Obligation Database-stores obligations that can be associated with rewards programs.

Available Alerts Database-stores alerts that can be associated with reward programs.

Alerts Database-stores active alerts.

Alerts Rules Database-stores rules for making alerts.

End User Database: stores relevant information about WCDs
   End User ID
   End user profile: a score of the customer based on their purchase behavior that can be used to qualify and end user for an offer End user device 1-n: the WCDs associated with the end user
End user transaction history
End user Offer history: offers that the end user has gotten in the past and whether or not they were accepted
Order Initiation Offer Database: available order initiation offers
　Offer ID
　Offer descriptor
Order Initiation Offer Rules Database: rules used to determine if an offer should be made to a WCD
　Offer rules ID
　Offer rules descriptor
　Applicable Offer ID 1-n
Qualification Metrics database: stores metrics used to qualify WCDs and order initiation offers
　Metric ID
　Descriptor
　Rules and Conditions
Customer ID
　Customer Transaction History
　Personal Information
　Email Address
　Offers made 1-n
　Referrer ID
　Referral ID
　Status
　Customer Type
Inventory Database
　Item ID
　Descriptor
　Quantity
　Price 1-n
　Offers 1-n
Transaction Database
　Transaction ID
　Items 1-n
　Offer ID 1-n
　Offer Accepted
　Accepted Offer Type
Offer Database
　Offer ID
　Item ID 1-n
　Offer Rules 1-n
　Customer ID 1-n
　Retailer ID
　Price (how much retailer pays if offer is made and/or redeemed)
　Time criteria 1-n
　Date Criteria 1-n
　Customer Criteria 1-n
　Offer payment price (what retailer will pay for offer to be made or redeemed)
　Traffic Criteria
　Geographic Range (how far device is from retailer on average or in real time)
Offer Rules Database
　Offer Rule ID
　Offer Conditions 1-n
　Customer ID 1-n
　Customer Type 1-n
　Offers 1-n
　Retailer 1-n
　Retailer Type
Retailer Database
　Retailer ID
　Type
　Offers 1-n
　Rules 1-n
　Conditions 1-n
　Rule Parameters 1-n (i.e. exclusion sets)
　Condition Parameters 1-n
　Offer Parameters 1-n (parameters used for System for Generating, Selecting, and
Running Executables in a Business System Utilizing a Combination of User Defined Rules and Artificial Intelligence)
Offer Selection Rules and Conditions
　Offer Selection Rule ID
　Descriptor
　Offers 1-n
　Offer rules and conditions 1-n
　End user device types
　End user 1-n It is to be understood that the embodiments and variations shown and described herein are merely illustrative of the principles of this invention and that various modifications may be implemented by those skilled in the art without departing from the scope and the spirit of the invention. For example, while the invention has been illustrated as being implemented using particular computer systems including hardware components such as a computer, POS terminals, portable employee terminals, and input and output devices, the invention could also be implemented using other hardware components and/or other interconnections between such components. Also, while the invention has been described as being implemented using a computer, some or all of the functionality could alternatively reside in a POS terminal or other computing device (e.g., a headset). The invention could also be implemented using discrete hardwired components instead of computers. Further, while the above description refers to particular databases, other databases or data structures could be used. In addition, while various embodiments of methods in accordance with the invention have been discussed which include specific steps listed in specific orders, a person of skill in the art will recognize that these steps can be performed in different combinations and orders. While other modifications will be evident to those skilled in the art, the present invention is intended to extend to those modifications that nevertheless fall within the scope of the appended claims.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A non-transitory computer-readable memory storing instructions configured so that when executed by a processor the instructions direct the processor to perform a method, the method comprising:
　storing, in a memory element for at least one specially-programmed general purpose computer, a transaction history for an account with respect to a business entity and an artificial intelligence program (AIP), wherein the transaction history includes at least one of:
　　a transaction involving the business entity and the account, or
　　a transaction involving the business entity and a sub-account of the account;

comparing, using a processor in the at least one specially-programmed general purpose computer, the transaction history with a metric;

generating, using the processor, the AIP, and the comparison of the transaction history with the metric, a desired transaction involving the account and the business entity;

generating, using the processor, the AIP, and the comparison of the transaction history with the metric, an incentive, wherein rewarding of the incentive is conditional upon execution of the desired transaction; and, transmitting, using an interface element for the at least one specially-programmed general purpose computer, the desired transaction and the incentive for presentation to a holder of the account.

2. The non-transitory computer-readable memory of claim 1 wherein the instructions are further configured to direct the processor to perform:

storing the metric in the computer-readable memory.

3. The non-transitory computer-readable memory of claim 1 wherein the instructions are further configured to direct the processor to perform:

storing data regarding the account in the computer-readable memory, the data being different than the transaction history; and generating the metric based on the data and the AIP.

4. The non-transitory computer-readable memory of claim 1 wherein the instructions are further configured to direct the processor to perform:

generating the incentive using the AIP.

5. The non-transitory computer-readable memory of claim 1 wherein the instructions are further configured to direct the processor to perform:

receiving, via the interface element, data regarding a transaction between the business entity and the account, transacted following transmission of the desired transaction and the modified incentive; and comparing the data with respect to the desired transaction; and, for compliance of the transaction with the desired transaction, authorizing reward of the modified incentive; or, for non-compliance of the transaction with the desired transaction, further modifying, using the AIP, the incentive according to the comparison of the transaction and the desired transaction.

6. The non-transitory computer-readable memory of claim 1 wherein the instructions are further configured to direct the processor to perform:

receiving, using the interface element for the at least one specially programmed general-purpose computer, an order from an end user device (EUD), the order including a first item or service available from a first business entity, wherein the desired transaction and the incentive are a first offer fulfillable as part of the order; and wherein transmitting the desired transaction and the incentive for presentation to the holder of the account comprises:

transmitting, using the interface element, the first offer to the EUD.

7. The non-transitory computer-readable memory of claim 6 wherein the instructions are further configured to direct the processor to perform:

generating, prior to fulfillment of the order by the first business entity and using the processor and the AIP, a second offer fulfillable after fulfillment of the order by the first business entity; and after completion of the order by the first business entity, transmitting, using the interface element, the second offer to the EUD.

8. The non-transitory computer-readable memory of claim 7 wherein the instructions are further configured to direct the processor to perform:

determining, using the processor and the AIP, whether to transmit the second offer before or after receipt of payment for the second offer.

9. The non-transitory computer-readable memory of claim 7 wherein the instructions are further configured to direct the processor to perform:

wherein the EUD is a wireless communications device (WCD) and the method further comprising the steps of:

storing at least one rule in a memory element for the WCD; and, executing, using a processor in the WCD, the first or second offer according to the at least one rule.

10. The non-transitory computer-readable memory of claim 7 wherein the instructions are further configured to direct the processor to perform:

receiving, using the interface element, at least one rule from a WCD, or from a general-purpose computer associated with a second business entity;

storing the at least one rule in the memory element; and, modifying the first or second offer using the processor and the at least one rule.

11. The non-transitory computer-readable memory of claim 7 wherein the instructions are further configured to direct the processor to perform:

requiring a selection by the holder of the account of only one of: the first offer, or the second offer.

12. The non-transitory computer-readable memory of claim 7 wherein transmitting the first offer and transmitting the second offer comprises:

transmitting the first offer and the second offer as a now or later offer.

13. The non-transitory computer-readable memory of claim 7 wherein the instructions are further configured to direct the processor to perform:

receiving, using the interface element, an indication of an acceptance by the holder of the account of only one of: the first offer, or the second offer.

* * * * *